United States Patent
Kasuga

(10) Patent No.: US 9,366,420 B2
(45) Date of Patent: Jun. 14, 2016

(54) LIGHTING EQUIPMENT AND DESK WITH ILLUMINATION FUNCTION

(71) Applicant: SEIKO EPSON CORPORATION, Tokyo (JP)

(72) Inventor: Hirofumi Kasuga, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 250 days.

(21) Appl. No.: 13/723,590

(22) Filed: Dec. 21, 2012

(65) Prior Publication Data

US 2013/0163232 A1 Jun. 27, 2013

(30) Foreign Application Priority Data

Dec. 26, 2011 (JP) .................................. 2011-282909
Sep. 25, 2012 (JP) .................................. 2012-210455

(51) Int. Cl.
| | |
|---|---|
| *A47B 23/06* | (2006.01) |
| *F21V 23/00* | (2015.01) |
| *F21V 33/00* | (2006.01) |
| *H05B 37/02* | (2006.01) |
| *F21V 21/088* | (2006.01) |
| *F21V 21/26* | (2006.01) |

(52) U.S. Cl.
CPC ........... *F21V 23/003* (2013.01); *F21V 33/0012* (2013.01); *H05B 37/0218* (2013.01); *F21V 21/088* (2013.01); *F21V 21/26* (2013.01); *Y02B 20/46* (2013.01)

(58) Field of Classification Search
CPC . F21V 23/003; F21V 33/0012; F21V 21/088; F21V 21/26; H05B 37/0218; Y02B 20/46
USPC .......................................................... 362/127
See application file for complete search history.

(56) References Cited

U.S. PATENT DOCUMENTS

| | | | |
|---|---|---|---|
| 2003/0037709 A1* | 2/2003 | Kolavo ........................ | 108/50.01 |
| 2007/0143793 A1* | 6/2007 | Barrett et al. ................... | 725/44 |
| 2008/0018590 A1* | 1/2008 | Lin ............................... | 345/156 |
| 2009/0036158 A1 | 2/2009 | Fujinawa et al. | |

FOREIGN PATENT DOCUMENTS

| | | |
|---|---|---|
| JP | 08-163476 A | 6/1996 |
| JP | 2007-074650 A | 3/2007 |
| JP | 2007-075215 A | 3/2007 |
| JP | 2009-171204 A | 7/2009 |
| JP | 2009-171207 A | 7/2009 |
| JP | 2011-096380 A | 5/2011 |
| JP | 2011-120883 A | 6/2011 |

* cited by examiner

*Primary Examiner* — Anh Mai
*Assistant Examiner* — Hana Featherly
(74) *Attorney, Agent, or Firm* — Maschoff Brennan

(57) ABSTRACT

A lighting equipment has a configuration including an illumination section capable of illuminating a surface to be an illumination object, an image projection section making it possible to project an image on the surface to be the illumination object, and a control section adapted to electrically control the illumination section and the image projection section.

19 Claims, 16 Drawing Sheets

| CEILING | 70 | 70 | 70 | 70 | 50 | 50 | 50 | 50 | 30 | 30 | 30 | 30 | 10 | 10 | 10 | 10 | 0 | ROOM REFLECTANCE |
|---|---|---|---|---|---|---|---|---|---|---|---|---|---|---|---|---|---|---|
| WALL | 70 | 50 | 30 | 10 | 70 | 50 | 30 | 10 | 70 | 50 | 30 | 10 | 50 | 30 | 10 | 0 | | |
| FLOOR | 10 | 10 | 10 | 10 | 10 | 10 | 10 | 10 | 10 | 10 | 10 | 10 | 10 | 10 | 10 | 10 | 0 | |
| ROOM INDEX | | | | | | | | | | | | | | | | | | UTILIZATION FACTOR |
| 0.60 | .38 | .31 | .27 | .23 | .37 | .30 | .26 | .23 | .35 | .30 | .26 | .23 | .29 | .26 | .23 | .22 | |
| 0.80 | .44 | .37 | .33 | .29 | .42 | .36 | .32 | .29 | .41 | .36 | .32 | .29 | .35 | .31 | .29 | .28 | |
| 1.00 | .49 | .42 | .38 | .35 | .47 | .41 | .37 | .34 | .45 | .40 | .37 | .34 | .39 | .36 | .34 | .32 | |
| 1.25 | .52 | .47 | .43 | .40 | .50 | .46 | .42 | .39 | .49 | .45 | .41 | .39 | .43 | .41 | .38 | .37 | |
| 1.50 | .55 | .50 | .46 | .43 | .53 | .49 | .46 | .43 | .51 | .48 | .45 | .42 | .47 | .44 | .42 | .41 | |
| 2.00 | .59 | .55 | .52 | .49 | .57 | .54 | .51 | .48 | .55 | .52 | .50 | .47 | .51 | .49 | .47 | .46 | |
| 2.50 | .61 | .58 | .55 | .53 | .59 | .56 | .54 | .52 | .57 | .55 | .53 | .51 | .54 | .52 | .51 | .49 | |
| 3.00 | .63 | .60 | .58 | .56 | .61 | .59 | .56 | .55 | .59 | .57 | .55 | .54 | .56 | .54 | .53 | .52 | |
| 4.00 | .65 | .62 | .60 | .59 | .63 | .61 | .59 | .58 | .61 | .59 | .58 | .57 | .58 | .57 | .56 | .55 | |
| 5.00 | .66 | .64 | .62 | .61 | .64 | .62 | .61 | .60 | .62 | .61 | .60 | .58 | .59 | .58 | .57 | .57 | |

FIG. 6

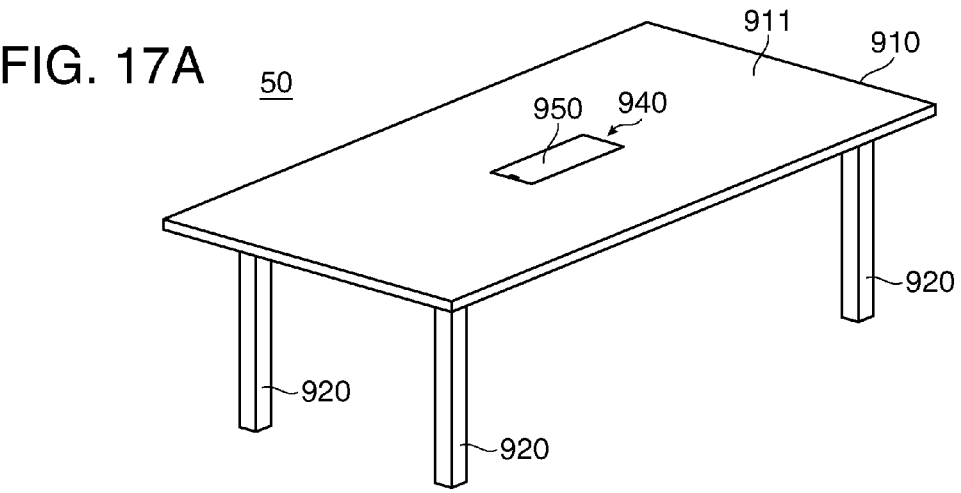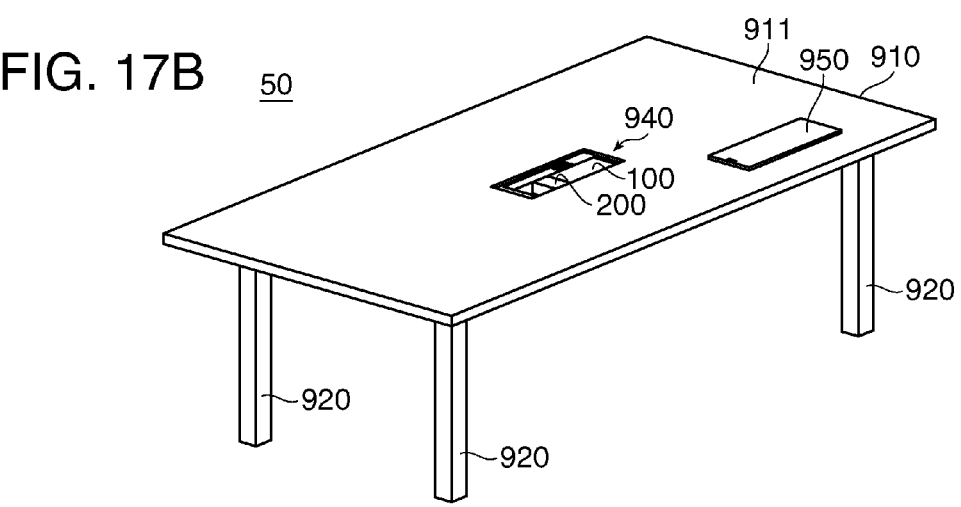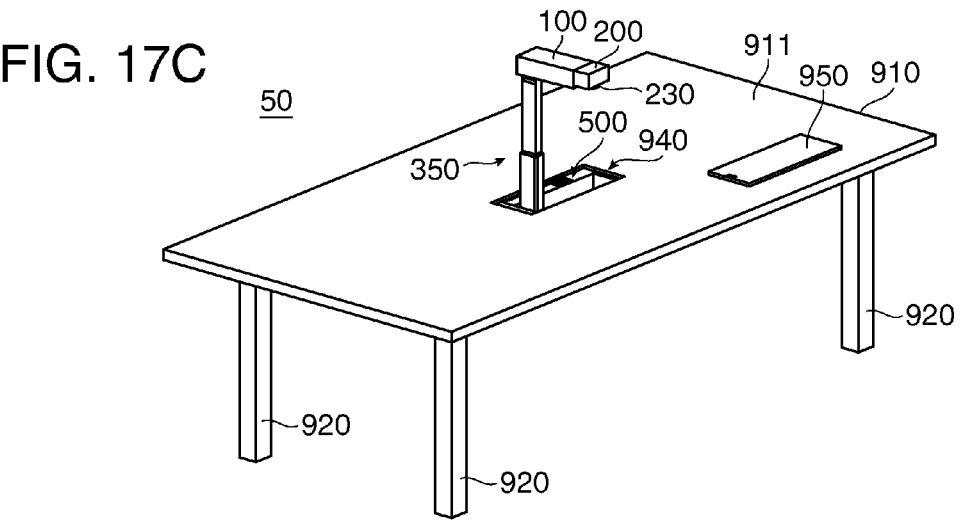

LIGHTING EQUIPMENT AND DESK WITH ILLUMINATION FUNCTION

The entire disclosure of Japanese Patent Application Nos. 2011-282909, filed Dec. 26, 2011, and 2012-210455, filed Sep. 25, 2012 are expressly incorporated by reference herein.

BACKGROUND

1. Technical Field

The present invention relates to a lighting equipment having an illumination function and an image projection function, and a desk with an illumination function.

2. Related Art

In the past, there has been known a desktop lighting equipment having an illumination function and an image projection function (see, e.g., JP-A-8-163476 (Patent Document 1)). The lighting equipment (hereinafter referred to as an existing lighting equipment) disclosed in Patent Document 1 has a light source, a light modulation element for modulating the light from the light source based on the image information to be projected to thereby form the image, and a projection lens for projecting the image emitted from the light modulation element in an enlarged manner.

In the case of using the existing lighting equipment having such a configuration for an illumination purpose, it is arranged that the light from the light source is projected in the state of providing no image information to be projected, while in the case of using the lighting equipment for an image projection purpose, it is arranged that the image based on the image information to be projected is formed, and then the image thus formed is projected. Thus, the existing lighting equipment is made available for the illumination purpose, and at the same time, is made available for the image projection purpose. Further, the illumination angle and the projection angle of the existing lighting equipment can be set in an adjustable manner using an adjustable arm, and therefore, the existing lighting equipment is a lighting equipment assumed to be mainly used while being attached to, for example, a student desk or an office desk.

However, in the case of using the existing lighting equipment for the illumination purpose while being attached to the student desk, the office desk, and so on, it is difficult to illuminate the surface (the surface of the desk) to be the illumination object so as to provide an appropriate illuminance throughout a wide range. This is because the existing lighting equipment has a configuration of using the same light source in both of the case of using the lighting equipment for the illumination purpose and the case of using it for the image projection purpose, and projecting an image in a limited range when projecting the image.

On the other hand, regarding the student desk, the office desk, and so on, it is preferable to perform illumination so as to provide the desk surface with an appropriate illuminance throughout a wide range. Therefore, there arises a problem that the existing lighting equipment is not suitable to be used for the student desk or the office desk, and is therefore limited in use.

SUMMARY

An advantage of some aspects of the invention is to provide a lighting equipment and a desk with an illumination function each having the illumination function and the image projection function to thereby make a wide variety of uses possible, and at the same time, capable of providing an appropriate illuminance to the surface to be the illumination object throughout a wide range.

[1] An aspect of the invention is directed to a lighting equipment including an illumination section capable of illuminating a surface to be an illumination object, an image projection section capable of projecting an image on the surface to be the illumination object, a control section adapted to electrically control the illumination section and the image projection section.

According to the lighting equipment of the aspect of the invention, since the illumination function and the image projection function are provided, a variety of usages become available. Further, since the configuration of having both of the illumination section and the image projection section is adopted, it becomes possible for the illumination section to achieve the function as a general lighting equipment, and to provide appropriate illuminance to the surface to be the illumination object throughout a broad range. Therefore, the lighting equipment according to the aspect of the invention can be made to be a lighting equipment suitable for a student desk and an office desk. It should be noted that "illuminance" in the aspect of the invention denotes the average illuminance on the surface to be the illumination object.

[2] In the lighting equipment of the above aspect of the invention, it is preferable that the control section makes a light source of the image projection section light to thereby make the image projection section function as an auxiliary illumination section.

By making the image projection section function as the auxiliary illumination section as described above, it is possible to provide the appropriate illuminance to the surface to be the illumination object throughout a broad range.

[3] In the lighting equipment of the above aspect of the invention, it is preferable that the control section has a function of calculating illuminance of the surface to be the illumination object in a state in which the illumination section performs illumination, and a function of determining whether or not the illuminance calculated is within an appropriate illuminance range set as a range of an appropriate illuminance, and then performing an illuminance adjustment so that the illuminance falls within the appropriate illuminance range based on a result of the determination, and adjusts brightness of the illumination section so that the illuminance falls within the appropriate illuminance range.

Thus, in the case of using the lighting equipment according to the aspect of the invention, for example, for a student desk and an office desk, since the desktop surface forms the surface to be the illumination object, it is possible to provide the most suitable illuminance for performing learning or paperwork to the desktop surface throughout a broad range. Further, by obtaining the illuminance using the calculation, it becomes unnecessary to provide an illuminance sensor and so on to the desktop surface, and thus the effective use of the desktop surface can be achieved.

[4] In the lighting equipment of the above aspect of the invention, it is preferable that the control section adjusts the brightness of the illumination section so that the illuminance falls within the appropriate illuminance range in one of a case in which the illuminance, which is obtained when the image projection section is made to function as the auxiliary illumination section, exceeds an upper limit value of the appropriate illuminance range, and a case in which the illuminance is lower than a lower limit value of the appropriate illuminance range.

By performing the illuminance adjustment by adjusting the brightness on the illuminance section side as described above, if the image projection section performs the image projection, it is possible to avoid the degradation of the brightness (luminance) on the image projection section side, and therefore, there is no chance of affecting the quality of the image projected at that moment.

[5] In the lighting equipment of the above aspect of the invention, it is preferable that the image projection section is disposed integrally with the illumination section.

By adopting such a configuration, if the image projection is necessary, the image projection can promptly be performed, and therefore, the lighting equipment can be made user-friendly.

[6] In the lighting equipment of the above aspect of the invention, it is preferable that the image projection section is detachably attached to the illumination section.

By adopting such a configuration, if the image projection section is unnecessary, the image projection section can be detached. Therefore, in the state in which the image projection section is detached, it is possible to make the lighting equipment compact.

[7] In the lighting equipment of the above aspect of the invention, it is preferable that the control section has a function of obtaining image information corresponding to the image to be projected from a network.

Thus, if the information existing on the Web, for example, is made obtainable, necessary information can easily be displayed.

[8] In the lighting equipment of the above aspect of the invention, it is preferable that the control section has a function of projecting a selection screen with which a type of the image to be projected can be selected.

Thus, it is possible to display information of a variety of fields, and it is possible to further diversify the purpose of the lighting equipment according to the aspect of the invention.

[9] In the lighting equipment of the above aspect of the invention, it is preferable that there is further provided an arm section adapted to support the illumination section.

By adopting such a configuration, the lighting equipment according to the aspect of the invention can easily be attached to a student desk and so on, and in the case of setting the state in which the lighting equipment is attached to the student desk with the arm section, an appropriate distance can be held between the desktop surface, the illumination section and the image projection section.

[10] In the lighting equipment of the above aspect of the invention, it is preferable that the arm section is an adjustable arm.

By adopting such a configuration, in the case of attaching the lighting equipment according to the aspect of the invention to the student desk or the like, since the illumination section and the image projection section can arbitrarily be moved on the desktop surface, the lighting equipment can be made user-friendly.

[11] In the lighting equipment of the above aspect of the invention, it is preferable that there is further provided a support member including a housing section having the surface to be the illumination object, and capable of housing the illumination section and the image projection section, and adapted to support the illumination section, the arm section intervenes between the illumination section and the housing section, and makes it possible to selectively set either one of a nonuse state in which the illumination section and the image projection section are housed in the housing section, and a usable state in which the illumination section and the image projection section are taken out from the housing section.

By adopting such a configuration, in the case in which the illumination section and the image projection section are not used, the illumination section and the image projection section can be set to the nonuse state by housing the illumination section and the image projection section in the housing section. Further, in the case of using the illumination section or the image projection section, the illumination section or the image projection section can be set to the usable state only by performing the operation of taking out the illumination section and the image projection section, which are housed in the housing section, from the housing section.

[12] In the lighting equipment of the above aspect of the invention, it is preferable that the arm section has a structure capable of at least one of a telescopic action and a folding action, and makes it possible to selectively set either one of the nonuse state and the usable state using the structure capable of at least one of the telescopic action and the folding action.

Since the arm section has such a structure, the operation of housing the illumination section and the image projection section into the housing section, or the operation of taking out the illumination section and the image projection section from the housing section can easily be performed.

[13] In the lighting equipment of the above aspect of the invention, it is preferable that the illumination section and the image projection section are arranged to be rotatable around the arm section on a plane along the surface to be the illumination object.

By adopting such a configuration, it is possible to move the illumination section and the image projection section on the plane along the surface to be the illumination object so as to draw a circular arc, and thus, the position where the illumination or the projection is performed on the surface to be the illumination object can arbitrarily be changed.

[14] In the lighting equipment of the above aspect of the invention, it is preferable that the support member is a desk, the surface to be the illumination object is a desktop surface of the desk, and the housing section is provided to the desktop surface.

By adopting such a configuration, an image can easily be projected on the desktop surface. Thus, in the case of, for example, holding a meeting around a desk (e.g., a conference table) with a relatively small group, the images necessary for the meeting can easily be projected on the desktop surface, and thus it is possible to smoothly proceed the meeting. It should be noted that in the present specification, it is assumed that anything having a top board forming the desktop surface and a top board support section (leg sections or a pedestal section) for supporting the top board is a "desk" in a broad sense. Therefore, it is assumed that the desk includes a student desk, an office desk, a conference table, a table for business negotiation in an outlet store or the like, a table for a front desk window installed in a front desk window of a financial institution and a hotel, and further a leisure facility, and so on.

[15] In the lighting equipment of the above aspect of the invention, it is preferable that the support member is a wall, the surface to be the illumination object is a surface of the wall, and the housing section is provided to the surface of the wall.

By adopting such a configuration, an image can easily be projected on the surface of the wall (also referred to as a wall surface). Thus, in the case of, for example, holding a meeting, the images necessary for the meeting can easily be projected on the wall surface, and thus it is possible to smoothly proceed the meeting. It should be noted that the lighting equipment having such a configuration can also be used for a variety of usages besides the meeting. For example, the lighting equipment is preferably used in the case of, for example, displaying some information for a predetermined period of time in a public facility or an office in order to inform the general public of the information.

[16] In the lighting equipment of the above aspect of the invention, it is preferable that the housing section has a lid capable of opening and closing the housing section, and the lid covers the housing section in the nonuse state in which the illumination section and the image projection section are housed in the housing section.

By providing such a lid, it is possible to roughly flat the entire surface to be the illumination object when the illumination section and the image projection section are in the nonuse state. Further, since the illumination section and the image projection section are not exposed, it becomes difficult for the dust to be attached to the illumination section and the image projection section, and an advantage of protecting the illumination section and the image projection section can also be obtained. It should be noted that the lid can also be a lid having a detachable structure, or can also be a lid having a structure slidable along the surface of the top board, or can also be a lid having a structure having one side supported by the top board with a hinge, and rotating within a predetermined angle range taking the hinge as an axis.

[17] Another aspect of the invention is directed to a desk with an illumination function, the desk including a top board having a surface to be an illumination object, a top board support section adapted to support the top board, an illumination section capable of illuminating the surface to be the illumination object, an image projection section capable of projecting an image on the surface to be the illumination object, a control section adapted to electrically control the illumination section and the image projection section, a housing section provided to the top board, and capable of housing the illumination section and the image projection section, and an arm section intervening between the illumination section and the housing section, and making it possible to selectively set either one of a nonuse state in which the illumination section and the image projection section are housed in the housing section, and a usable state in which the illumination section and the image projection section are taken out from the housing section.

According to the desk with an illumination function of the aspect of the invention, since it is possible to perform not only the illumination but also the image projection, a variety of usages become available. For example, an image can easily be projected on the desktop surface (the surface of the top board). Thus, as described above, in the case of, for example, holding a meeting around a desk (e.g., a conference table) with a relatively small group, the images necessary for the meeting can easily be projected on the desktop surface, and thus it is possible to smoothly proceed the meeting.

Further, according to the desk with an illumination function of the aspect of the invention, since the housing section capable of housing the illumination section and the image projection section is provided to the top board, when the illumination section and the image projection section are not used, it is possible to set the state in which illumination section and the image projection section are housed in the housing section. Further, in the case of using the illumination section or the image projection section, the illumination section or the image projection section can be set to the usable state only by performing the operation of taking out the illumination section and the image projection section, which are housed in the housing section, from the housing section.

It should be noted that in also the desk with an illumination function according to the aspect of the invention, it is preferable to have the features [2] to [8], [10], [12], [13] and [16] described above, out of the features of the lighting equipment according to the aspect of the invention.

BRIEF DESCRIPTION OF THE DRAWINGS

The invention will be described with reference to the accompanying drawings, wherein like numbers reference like elements.

FIG. 6 is a diagram showing a utilization factor table from which the utilization factor can be obtained based on the room reflectance and the room index.

FIGS. 17A through 17C are diagrams showing a desk with an illumination function according to a fifth embodiment of the invention for the purpose of the explanation thereof.

DESCRIPTION OF EXEMPLARY EMBODIMENTS

Hereinafter, some examples of the lighting equipment and the desk with an illumination function as embodiments of the invention will be explained.

First Embodiment

Figure 1:
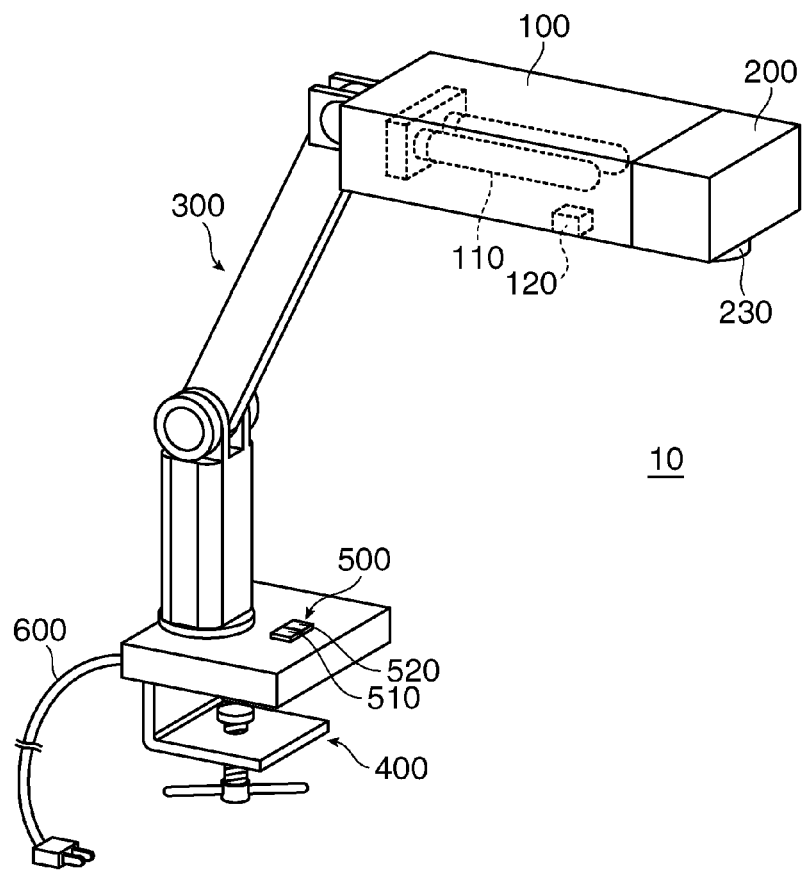
FIG. 1 is a diagram showing an appearance configuration of a lighting equipment according to a first embodiment of the invention.

FIG. 1 is a diagram showing an appearance configuration of a lighting equipment 10 according to a first embodiment of the invention. The lighting equipment 10 according to the first embodiment is provided with an illumination section 100 capable of illuminating a surface (e.g., a surface of a desk) to be an illumination object, an image projection section 200 disposed adjacent to the illumination section 100 so as to be able to project an image on the surface to be the illumination object, an arm section 300 for supporting the illumination section 100 so as to be able to adjustably move the illumination section 100 in, for example, a horizontal direction and a vertical direction, a fixation section 400 for fixing the lighting equipment 10 according to the first embodiment to a desk and so on, an operation section 500 capable of a variety of types of operations, and a connecting cord 600 connectable to an electrical outlet (not shown). Further, the illumination section 100 has a distance measurement section 120 for measuring the distance to the surface to be the illumination object, and the image projection section 200 has a projection lens 230. It should be noted that the arm section 300 is assumed to be an adjustable arm. Therefore, the "arm section 300" may also be described as an "adjustable arm 300" in some cases.

It should be noted that although in FIG. 1 there is adopted the configuration in which the image projection section 200 is adjacent to the illumination section 100, it is also possible to adopt the configuration in which some object intervenes between the illumination section 100 and the image projection section 200 instead of the adjacent configuration.

The illumination section 100 has a light source 110 (hereinafter referred to as an illumination light source 110) inside, and functions as a normal lighting equipment by lighting the illumination light source 110. The illumination light source 110 is not particularly limited, but an incandescent bulb, a fluorescent lamp, an LED lamp and so on can be used.

Further, the image projection section 200 is disposed integrally with the illumination section 100, and is arranged to be able to be translated together with the illumination section 100.

The operation section 500 has a main switch 510 functioning as a basic switch of the lighting equipment 10 according to the first embodiment, and an image projection start switch 520 for making the start of the image projection possible. It should be noted that although not shown the operation section 500 is also provided with a variety of types of operation buttons such as a button for focus adjustment besides these switches.

The main switch 510 is a switch for lighting the illumination light source 110 of the illumination section 100, and at the same time starting up a control section 550 (see FIG. 3) to thereby make a variety of types of control possible. It should be noted that the control performed by the control section 550 will be described later. Further, the image projection start switch 520 is a switch for starting the projection of the image by the image projection section 200.

Figure 2:
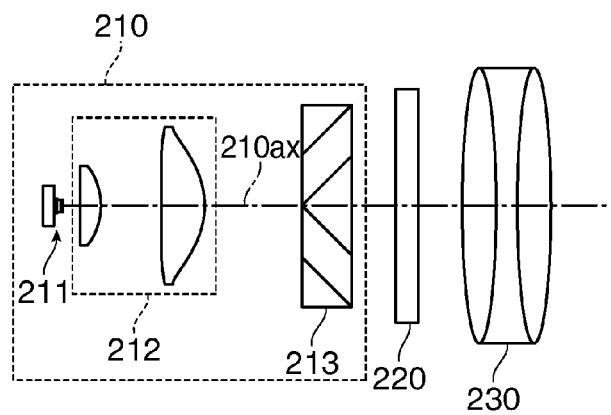
FIG. 2 is a diagram schematically showing a configuration of an optical system of an image projection section shown in FIG. 1.

FIG. 2 is a diagram schematically showing a configuration of an optical system of the image projection section 200 shown in FIG. 1. The image projection section 200 has substantially the same configuration as a single plate liquid crystal projector, and has a light source section 210, a liquid crystal light modulation element 220, and a projection lens 230.

The light source section 210 is provided with a light source 211 (hereinafter referred to as an image projection light source 211) formed of a white light emitting diode and so on, a collimator optical system 212, and a polarization conversion element 213. Although the detailed explanation is omitted here, the image projection light source 211 emits the light including red light, green light, and blue light.

The collimator optical system 212 is an optical element for collimating the light emitted from the image projection light source 211. The polarization conversion element 213 is an element for performing the polarization conversion on the light transmitted through the collimator optical system 212. The polarization conversion element 213 has a polarization split layer for transmitting one linearly polarized component out of the polarization components of the incident light without modification while reflecting the other linearly polarized component in a direction perpendicular to a light axis 210$ax$, a reflecting layer for reflecting the other linearly polarized component, which has been reflected by the polarization split layer, in a direction parallel to the light axis 210$ax$, and a wave plate for converting the other linearly polarized component having been reflected by the reflecting layer into the one linearly polarized component.

The liquid crystal light modulation element 220 is a light modulation device for modulating the light from the light source section 210 in accordance with the image information to be projected to thereby form a full-color image. The liquid crystal light modulation element 220 has a color filter (not shown). The color filter is formed of a Bayer arrangement color filter having a reflective dichroic filter, and has a function as a color separation optical system for separating the light from the light source section 210 into the red light, the green light, and the blue light pixel by pixel. It should be noted that other color separation optical systems can also be used as the color separation optical system.

Further, the liquid crystal light modulation element 220 further includes an entrance side polarization plate (not shown) disposed on the polarization conversion element 213 side, and an exit side polarization plate (not shown) disposed on the projection lens 230 side. The entrance side polarization plate, the liquid crystal light modulation element 220, and the exit side polarization plate perform the light modulation of the respective colored lights. The liquid crystal light modulation element 220 described above is driven by a liquid crystal light modulation element drive section 221 (see FIG. 3).

Further, the projection lens 230 projects the image thus formed by the liquid crystal light modulation element 220 on a projection surface in an enlarged manner.

Figure 3:
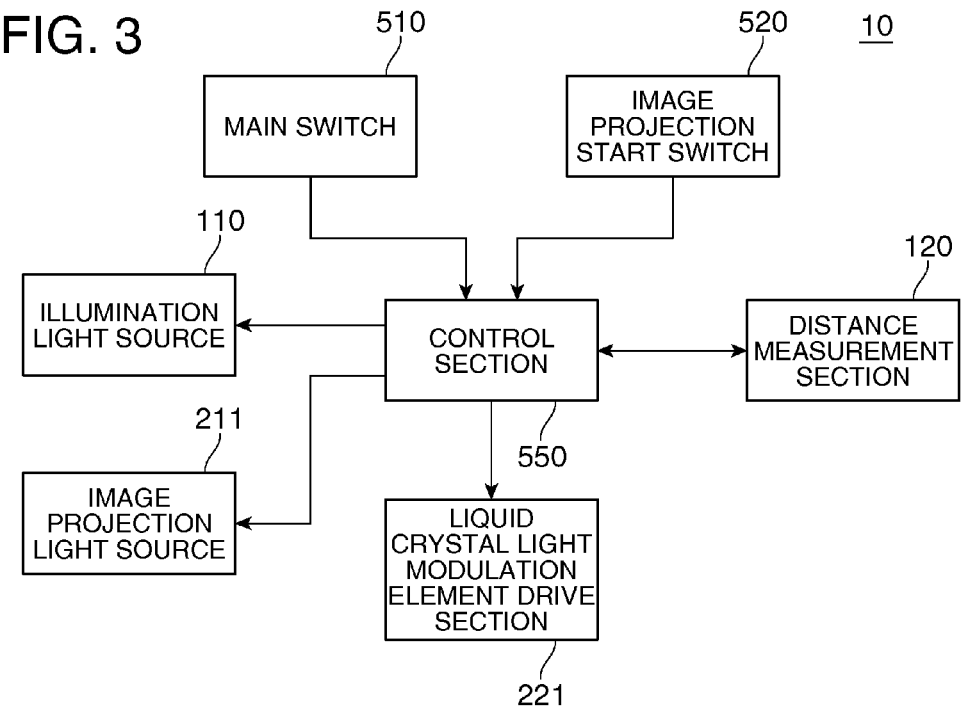
FIG. 3 is a block diagram for explaining the electrical control of the lighting equipment according to the first embodiment.

FIG. 3 is a block diagram for explaining the electrical control of the lighting equipment 10 according to the first embodiment. The lighting equipment 10 according to the first embodiment has the control section 550, and when the main switch 510 or the image projection start switch 520 is operated, the control section 550 controls the illumination light source 110, the image projection light source 211, the distance measurement section 120, the liquid crystal light modulation element drive section 221, and so on in accordance with the operation of the main switch 510 or the image projection start switch 520.

Then, the control performed by the control section 550 will specifically be explained. When the main switch 510 is set to the ON state, the control section 550 puts on the illumination light source 110 of the illumination section 100, and at the same time issues a distance measurement instruction to the distance measurement section 120. Thus, the distance measurement section 120 performs the measurement of the distance to the surface to be the illumination object. Further, a variety of types of control to the image projection section 200 are made possible. It should be noted that it is assumed that in the step in which the main switch 510 is set to the ON state, it becomes possible for the control section 550 to control lighting/extinction of the image projection light source 211 of the image projection section 200. It should be noted that it is assumed that the control (the control of driving the liquid crystal light modulation element 220 based on the image information to be projected) for projecting the actual image is enabled by setting the image projection start switch 520 to the ON state.

Further, the control section 550 has a function of calculating the average illuminance of the surface to be the illumination object based on the distance measured by the distance measurement section 120 besides the function of controlling the illumination light source 110, the distance measurement section 120, the image projection light source 211, and the liquid crystal light modulation element drive section 221 described above. Further, the control section 550 has, for example, a Web information acquisition function capable of obtaining information existing in the Web, and a communication function capable of receiving television broadcasting (hereinafter referred to as TV broadcasting). Further, the control section 550 has a storage section (not shown).

Figure 4:
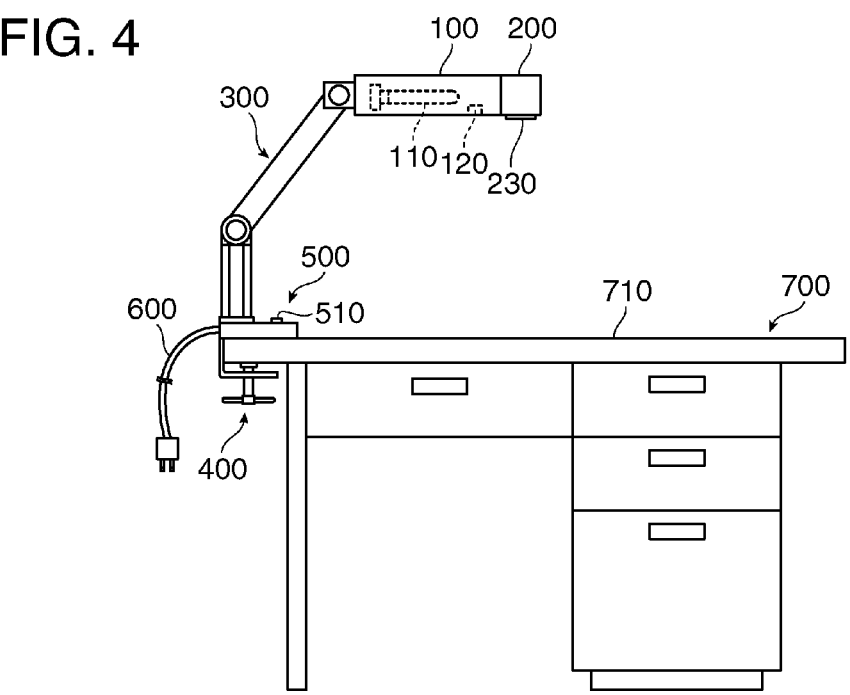
FIG. 4 is a diagram showing an installation example of the lighting equipment according to the first embodiment.

FIG. 4 is a diagram showing an installation example of the lighting equipment 10 according to the first embodiment. As shown in FIG. 4, the lighting equipment 10 according to the first embodiment is attached to a student desk 700. Therefore, in the lighting equipment 10, the surface to be the illumination object corresponds to a desktop surface 710 of the student desk 700. Further, the image projection section 200 is attached to the illumination section 100 so that it becomes possible to project the image on the surface (the desktop surface 710) to be the illumination object.

Figure 5:
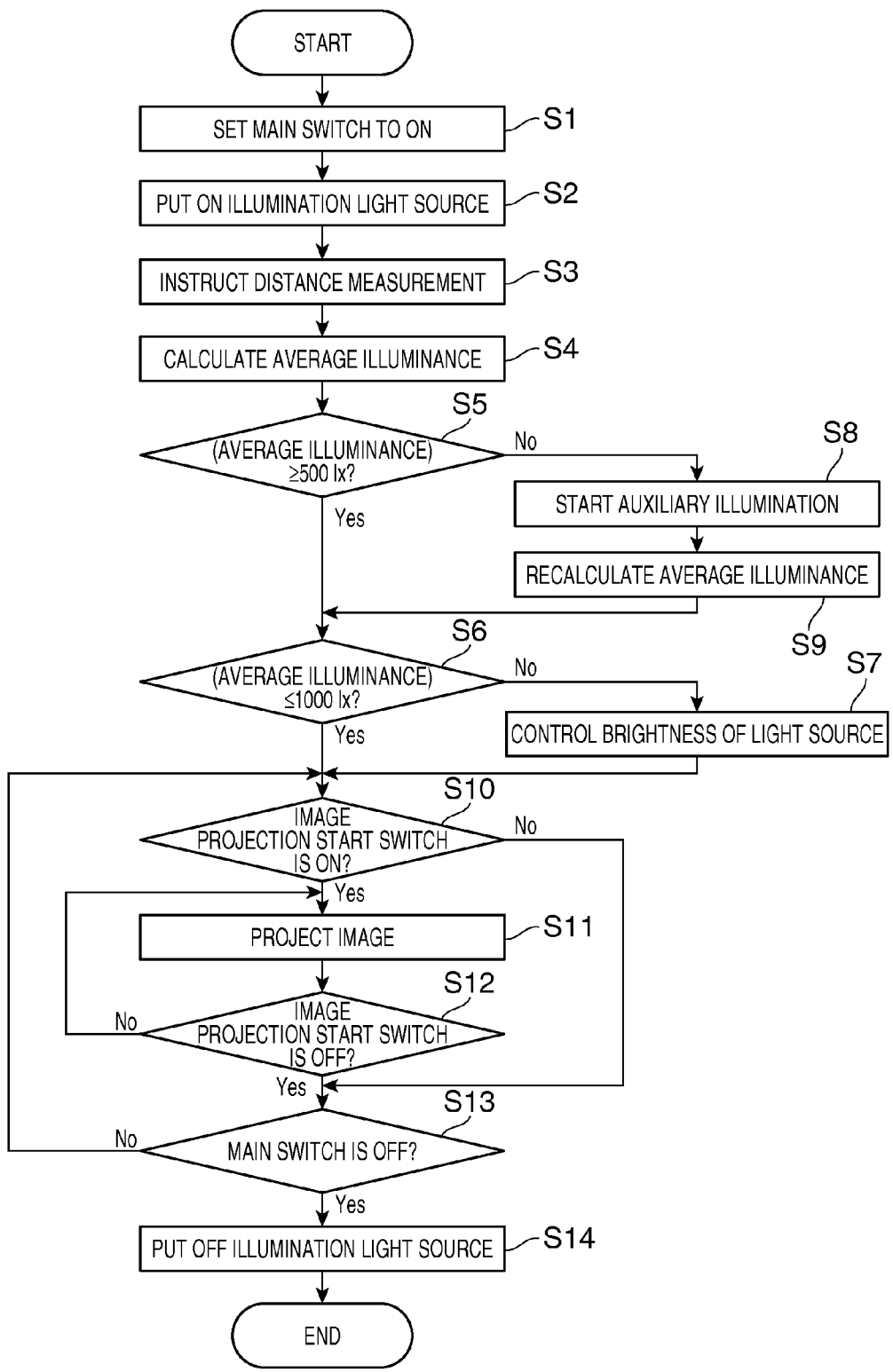
FIG. 5 is a flowchart showing a basic operation of the lighting equipment according to the first embodiment for the purpose of the explanation thereof.

FIG. 5 is a flowchart showing a basic operation of the lighting equipment 10 according to the first embodiment for the purpose of the explanation thereof. It should be noted that the flowchart shown in FIG. 5 is mainly for explaining the action performed by the control section 550, but partially includes the operation performed by the user.

When the main switch 510 is set (step S1) to the ON state by the user, the control section 550 puts on (step S2) the illumination light source 110. Thus, the lighting equipment 10 is set to the state of functioning as the illumination, and at the same time is set to the state in which the control of the image projection light source 211 of the image projection section 200 is possible. In the state in which the lighting equipment 10 according to the first embodiment functions as the illumination as described above, the control section 550 issues (step S3) the distance measurement instruction to the distance measurement section 120, and then calculates (step S4) the average illuminance of the surface to be the illumination object, namely the desktop surface 710, using the distance thus measured.

Then, the control section 550 determines whether or not the average illuminance thus calculated is in an appropriate range, and then performs (steps S5 through S9) the illuminance adjustment so as to set the average illuminance within the appropriate illuminance range based on the determination result. Incidentally, the range (hereinafter referred to as an appropriate illuminance range) of the appropriate illuminance for the average illuminance of the desktop surface 710 in the student desk 700 is regarded as the range of 500 through 1000 lx (lux). Therefore, here, the control section 550 determines whether or not the average illuminance of the desktop surface 710 is within the range of 500 through 1000 lx, and then performs the illuminance adjustment based on the determination result.

Specifically, the control section 550 firstly determines (step S5) whether or not the average illuminance is equal to or higher than 500 lx, and if the average illuminance is equal to or higher than 500 lx (in the case of "Yes" in the step S5), the control section 550 determines (step S6) whether or not the average illuminance is equal to or lower than 1000 lx. Here, if the average illuminance exceeds 1000 lx (in the case of "No" in the step S6), the control section 550 controls (step S7) the brightness of the light source (the illumination light source 110 in this case) so that the average illuminance falls within the appropriate illuminance range (the range of 500 through 1000 lx).

In contrast, if it is determined in the step S5 that the average illuminance is lower than 500 lx (in the case of "No" in the step S5), the control section 550 puts on the image projection light source 211 of the image projection section 200, and makes the image projection section 200 function as an auxiliary illumination section. Thus, the auxiliary illumination is started (step S8). It should be noted that on this occasion, the image projection section 200 performs the illumination on the desktop surface 710 with white light. Then, the control section 550 recalculates (step S9) the average illuminance in this state, and then determines (step S6) whether or not the average illuminance (the average illuminance obtained by adding the average illuminance due to the illumination section 100 and the average illuminance due to the image projection section 200) obtained by the recalculation is equal to or lower than 1000 lx.

Then, if the average illuminance obtained by the recalculation exceeds 1000 lx (in the case of "No" in the step S6), the control section 550 controls (step S7) the brightness of the light source so that the average illuminance falls within the appropriate illuminance range (the range of 500 through 1000 lx). It should be noted that although the control of the brightness of the light source performed here is the control of dropping the brightness of at least either one of the illumination light source 110 and the image projection light source 211, it is preferable to drop the brightness of the illumination light source 110 in this case. It should be noted that hereinafter the "brightness of the illumination light source 110" may be described as the "brightness of the illumination section 100" in some cases, and the "brightness of the image projection light source 211" may be described as the "brightness of the image projection section 200" in some cases.

Subsequently, the control section 550 determines (step S10) whether or not the image projection start switch 520 is in the ON state, and if the image projection start switch 520 is not in the ON state (in the case of "No" in the step S10), the control section 550 determines (step S13) whether or not the main switch 510 is in the OFF state. Here, if the main switch 510 is in the OFF state (in the case of "Yes" in the step S13), the control section 550 puts off the illumination light source 110 and the image projection light source 211. Further, if the main switch 510 is not in the OFF state in the step S13 (in the case of "No" in the step S13), the control section 550 returns to the step S10, and then determines again whether or not the image projection start switch 520 is in the ON state.

In contrast, if the image projection start switch 520 is set to the ON state in the step S10 (in the case of "Yes" in the step S10), the control section 550 generates the image to be projected by modulating the light from the image projection light source 211 based on the image information corresponding to the image to be projected, and then projects (step S11) the image thus generated. For example, if the acquisition of the information from a Web site is possible, the control section 550 projects the image based on the information obtained from the Web site on the desktop surface 710. It should be noted that the focus adjustment of the projection lens 230 in the case of projecting the image on the desktop surface 710 becomes possible by, for example, operating a focus adjustment button (not shown).

Then, the control section 550 determines (step S12) whether or not the image projection start switch 520 is in the OFF state, and continues the image projection if the image projection start switch 520 is not in the OFF state (in the case of "No" in the step S12), or stops the image projection if the image projection start switch 520 is in the OFF state (in the case of "Yes" in the step S12). Then, the control section 550 determines (step S13) whether or not the main switch 510 is in the OFF state.

Incidentally, it is possible to dispose a plurality of illuminance sensors respectively at predetermined positions on the desktop surface 710, and to detect the average illuminance on the desktop surface 710 based on the respective illuminance values obtained by the plurality of illuminance sensors. Further, in the case of detecting the illuminance at a certain specific place on the desktop surface 710 instead of the average illuminance, it is sufficient to provide an illuminance sensor to the desktop surface 710. However, in either of the cases, if the illuminance sensor is disposed on the desktop surface 710, the illuminance sensor is covered by, for example, a notebook or a textbook, and thus it is unachievable to detect an appropriate average illuminance.

Therefore, in the lighting equipment 10 according to the first embodiment, the average illuminance of the desktop surface 710 is obtained by Formula 1 below, and the illuminance adjustment (the steps S5 through S9) is performed based on the average illuminance thus obtained.

$$\text{average illuminance } (lx) = \{(\text{lamp luminous flux } (lm)) \times (\text{the number of light sources of the illumination section}) \times (\text{the number of illumination sections}) \times (\text{utilization factor}) \times (\text{maintenance factor})\} / (\text{the area of desktop surface } (m^2))  \quad (1)$$

It should be noted that in Formula 1, "the lamp luminous flux as a light source (lumen (lm))," "the number of light sources (the number of light sources of the illumination section 100) of the illumination section," "the number (the number of illumination sections 100) of illumination sections," "the maintenance factor," and "the area ((the depth of the desktop surface 710)×(the width of the desktop surface 710) of the desktop surface" are known data. Here, the maintenance factor denotes a numerical value representing the deterioration of the luminous flux (lm) of the lamp with the elapse of time due to the grime of the lamp caused by the environment, and the numerical value can be set in accordance with, for example, the condition of the dust in the use environment. For example, the maintenance factor can be set to "0.74" if the use environment is preferable, or can be set to "0.70" if the use environment is standard, or can be set to "0.62" if the use environment is bad.

Therefore, if the utilization factor is known in Formula 1, the average illuminance can be obtained. In the lighting equipment 10 according to the first embodiment, the utilization factor is obtained from the utilization factor table shown in FIG. 6. The utilization factor table shown in FIG. 6 is arranged so that the utilization factor can be obtained based on the room reflectance and the room index.

Here, the room reflectance is a value set in accordance with the material, the color, and so on of the ceiling, the walls, and the floor of the room where the student desk 700 is installed. It should be noted that the "floor" can be substituted with the desktop surface 710 of the student desk 700. Here, it is assumed that the reflectance of the ceiling of the room where the student desk 700 is installed is "70%," the reflectance of the walls thereof is "50%," and the reflectance of the desktop surface 710 is "10%."

On the other hand, the room index can be obtained by Formula 2 below. It should be noted here that since the surface to be the illumination object is the desktop surface 710, the room index is also referred to as a "desktop-surface index."

$$(\text{the desktop-surface index(the room index)}) = (\text{the area of the desktop surface}) / [\{(\text{the depth of the desktop surface}) + (\text{the width of the desktop surface})\} \times (\text{the height of the illumination section})]  \quad (2)$$

It should be noted that in Formula 2 "the area of the desktop surface" and "(the depth of the desktop surface)+(the width of the desktop surface)" are known data. Further, as "the height of the illumination section," the value measured by the distance measurement section 120 can be used. By using these values, the desktop-surface index (the room index) can be obtained by Formula 2.

Then, the utilization factor is obtained from the utilization factor table shown in FIG. 6 based on the desktop-surface index and the room reflectance thus obtained. It should be noted that numbers of decimal places are shown as the utilization factor in FIG. 6. Here, it is assumed that the desktop-surface index has been obtained by Formula 2 as "2.5." Therefore, based on the desktop-surface index of "2.5" obtained by Formula 2, the reflectance of "70%" of the ceiling of the room where the student desk 700 is installed, the reflectance of "50%" of the walls thereof, and the reflectance of "10%" of the desktop surface 710, the utilization factor of "0.58" can be obtained from the utilization factor table shown in FIG. 6.

In such a manner as described above, if the utilization factor is obtained, the average illuminance can be obtained by substituting the utilization factor thus obtained into Formula 1.

It should be noted that although the process of calculating the average illuminance in the step S4 of the flowchart shown in FIG. 5 is the process of calculating the average illuminance in the state in which the image projection section 200 does not perform the auxiliary illumination, if the average illuminance calculation (the average illuminance recalculation in the step S9) in the case in which the image projection section 200 performs the auxiliary illumination is performed, the total average illuminance obtained by adding the average illuminance due to the image projection section 200 to the average illuminance (the average illuminance calculated by Formula 1) due to the illumination section 100 is calculated.

In this case, the average illuminance due to the image projection section 200 is calculated in the following manner. Specifically, since the projection luminance (lm) due to the projection section 200 has been determined, the average illuminance of the desktop surface 710 due to the image projection section 200 can be obtained as a value obtained by dividing "the projection luminance (lm)" by "the area (m²) of the desktop surface 710." Therefore, the average illuminance in the case in which the image projection section 200 performs the auxiliary illumination can be obtained as the total average illuminance obtained by adding the average illuminance of the desktop surface 710 due to the image projection section 200 obtained in such a manner as described above to the average illuminance (the average illuminance calculated by Formula 1 described above) due to the illumination section 100.

It should be noted that if the total average illuminance exceeds 1000 lx, it is preferable that the brightness of the illumination section 100 is dropped when performing the process of dropping the brightness of the light source in the step S7. This is because if the brightness (the luminance) of the image projection section 200 is dropped, the quality of the projection image projected by the image projection section 200 is made to degrade. Therefore, in the case of performing the illuminance adjustment of dropping the average illuminance, it is preferable to arrange that the brightness on the illumination section 100 side is dropped. Further, if the average illuminance of the desktop surface 710 is lower than 500 lx, it is also preferable to perform the control so as to increase the brightness of the illumination section 100 without varying the brightness of the image projection section 200.

It should be noted that in the case of using the image projection section 200 only as the auxiliary light source, namely the case in which the image projection section 200 does not perform the actual image projection, it is also possible to arrange that the brightness of the illumination section 100 is made to drop and at the same time the brightness of the image projection section 200 is also made to drop, and it is also possible to arrange that the brightness of the image projection section 200 alone is made to drop.

As explained hereinabove, since in the lighting equipment 10 according to the first embodiment the average illuminance of the desktop surface 710 is calculated, whether or not the average illuminance thus calculated is within the appropriate illuminance range is determined, and the illumination adjustment of making the average illuminance be within the appropriate illuminance range is performed based on the determination result, it is possible to hold the average illuminance of the desktop surface 710 within the appropriate illuminance range suitable for learning.

Further, the average illuminance of the desktop surface 710 is calculated, and if the average illuminance of the desktop surface 710 does not reach the lower limit value of the appropriate illuminance range as a result of determining whether or not the average illuminance calculated is within the appropriate illuminance range, the auxiliary illumination is performed by the image projection section 200. Therefore, it is possible to increase the illuminance of the desktop surface 710 to a high level. It should be noted that in the case in which the auxiliary illumination is performed by the image projection section 200, the brightness of the illumination section 100 is controlled so that the total average illuminance of the average illuminance due to the illumination section 100 and the average illuminance due to the image projection section 200 does not exceed the appropriate illuminance range. Therefore, the illuminance of the desktop surface 710 can be held within the appropriate illuminance range.

Further, in the lighting equipment 10 according to the first embodiment, since the image projection can be performed by the image projection section 200 if necessary, it is possible to obtain, for example, information necessary for learning from, for example, a Web site, and then project the information thus obtained on the desktop.

Second Embodiment

In a lighting equipment 20 according to a second embodiment, it is arranged that the type of the image to be projected can be selected. It should be noted that it is assumed that the types of the images, which can be projected in the lighting equipment 20 according to the second embodiment, include the TV broadcasting, and memorandum information input by the user from a software keyboard or the like besides the information existing on the Web sites.

Further, in some of the operations performed by the user on the lighting equipment 20 according to the second embodiment, the user performs some sort of action (gesture), the imaging section 130 (see FIG. 7) images the action performed by the user, and then provides the imaged image data to the control section 550, and then the control section 550 performs predetermined control based on the imaged data.

Figure 7:
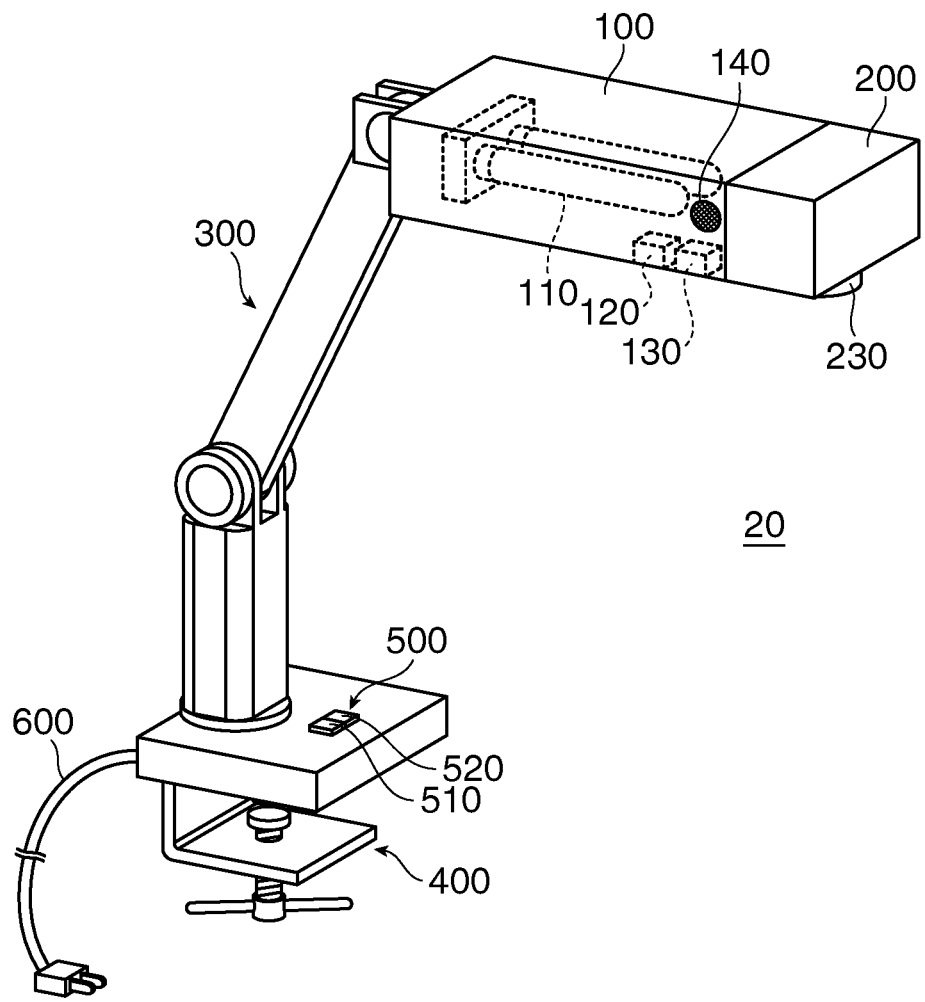
FIG. 7 is a diagram showing an appearance configuration of a lighting equipment according to a second embodiment of the invention.

FIG. 7 is a diagram showing an appearance configuration of the lighting equipment 20 according to the second embodiment. The lighting equipment 20 according to the second embodiment is different from the lighting equipment 10 according to the first embodiment in the point that the imaging section 130 and a sound output section (a speaker) 140 are provided, and the same constituents as those of the lighting equipment 10 according to the first embodiment are denoted with the same reference numerals. It should be noted that the installation positions of the imaging section 130 and the sound output section 140 are not limited to the positions shown in FIG. 7. Further, it is assumed that the optical system of the image projection section 200 has substantially the same configuration as that of the lighting equipment 10 according to the first embodiment.

Figure 8:
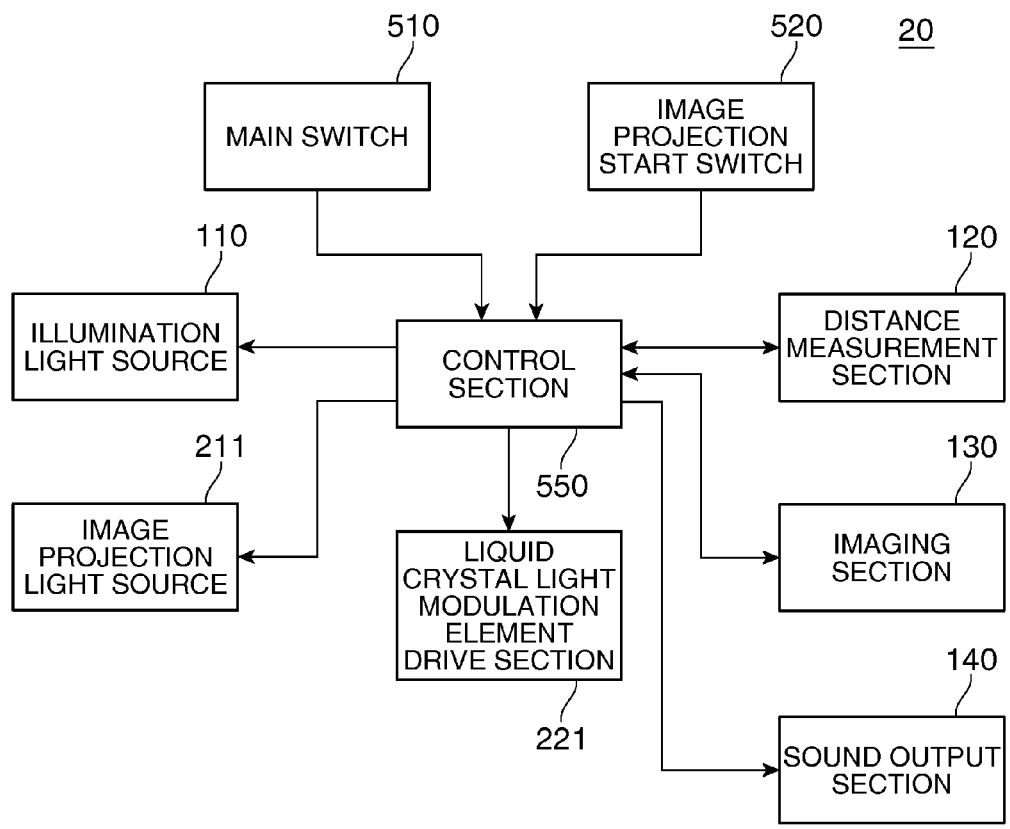
FIG. 8 is a block diagram for explaining the electrical control of the lighting equipment according to the second embodiment.

FIG. 8 is a block diagram for explaining the electrical control of the lighting equipment 20 according to the second embodiment. It should be noted that the configuration diagram shown in FIG. 8 is basically the same as FIG. 1, but is different from the lighting equipment 10 according to the first embodiment in the point that the imaging section 130 and the sound output section 140 are provided.

Figure 9:
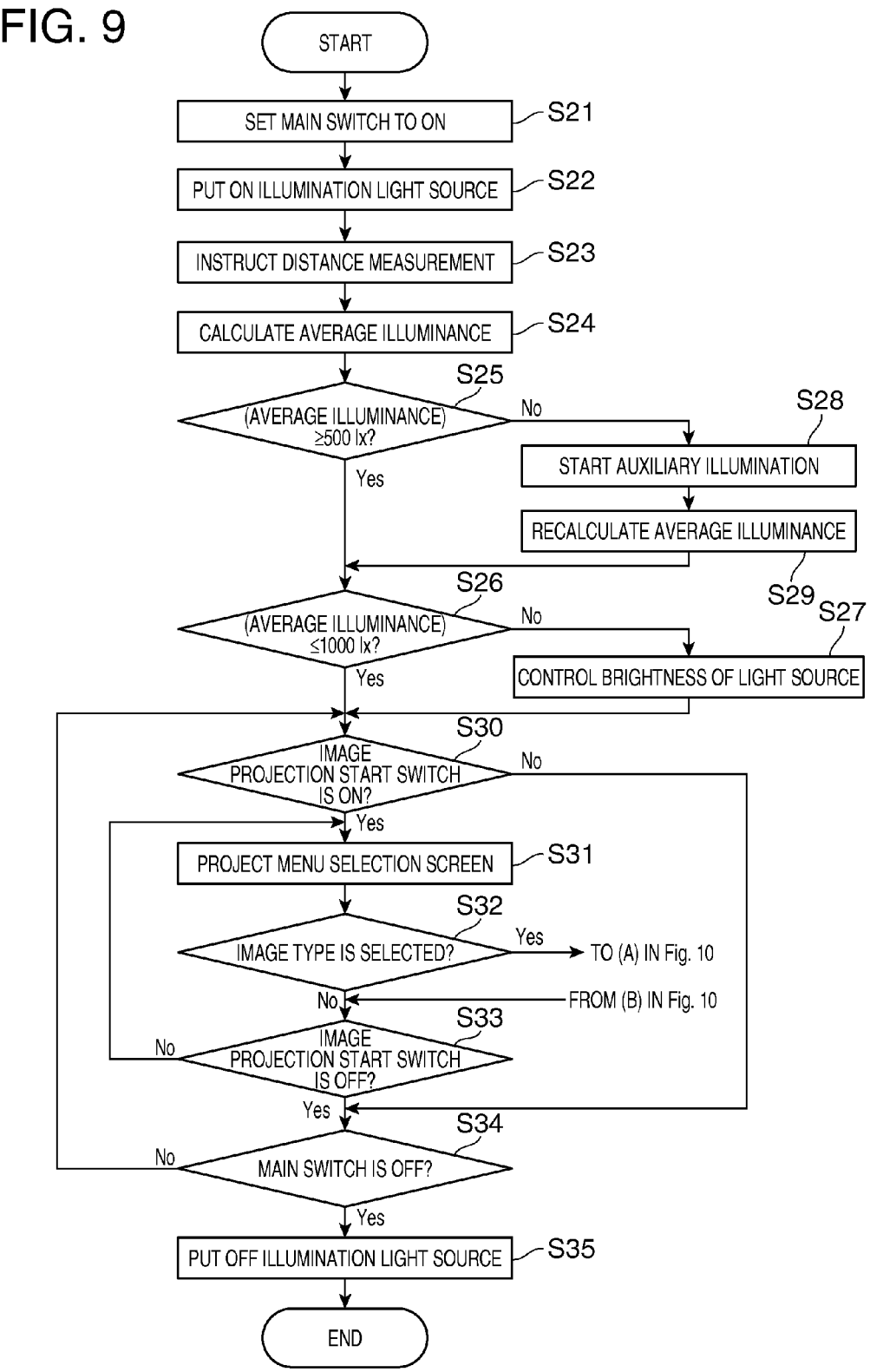
FIG. 9 is a flowchart for explaining an operation in the lighting equipment according to the second embodiment.

FIG. 9 is a flowchart for explaining an operation in the lighting equipment 20 according to the second embodiment. Similarly to the flowchart shown in FIG. 5, the flowchart shown in FIG. 9 is mainly for explaining the action performed by the control section 550, but partially includes the operation performed by the user. It should be noted that since the steps S21 through S30 are the same as the steps S1 through S10 in FIG. 5, the explanation therefor will be omitted.

The case (the case of "Yes" in the step S30) in which it is determined in the flowchart shown in FIG. 9 that the image projection start switch 520 is in the ON state will be explained. In the case in which the image projection start switch 520 is in the ON state, a selection screen (referred to as a menu selection screen) with which the type of the image to be projected can be selected is projected (step S31). After projecting the menu selection screen, the control section 550 determines (step S32) whether or not the user has selected the type of the image from the menu selection screen.

Here, if the user has selected the type of the image (in the case of "Yes" in the step S32), the process proceeds to a pass "A" (see FIG. 10), and if the user has not selected the type of the image (in the case of "No" in the step S32), whether or not the image projection start switch 520 is in the OFF state is determined (step S33). If the image projection start switch 520 is in the OFF state (in the case of "Yes" in the step S33), whether or not the main switch 510 is in the OFF state is determined (step S34). Since the step S34 and the steps following from the step S34 are the same as the process of the step S13 and the steps following therefrom in FIG. 5, the explanation therefor will be omitted.

Figure 10:
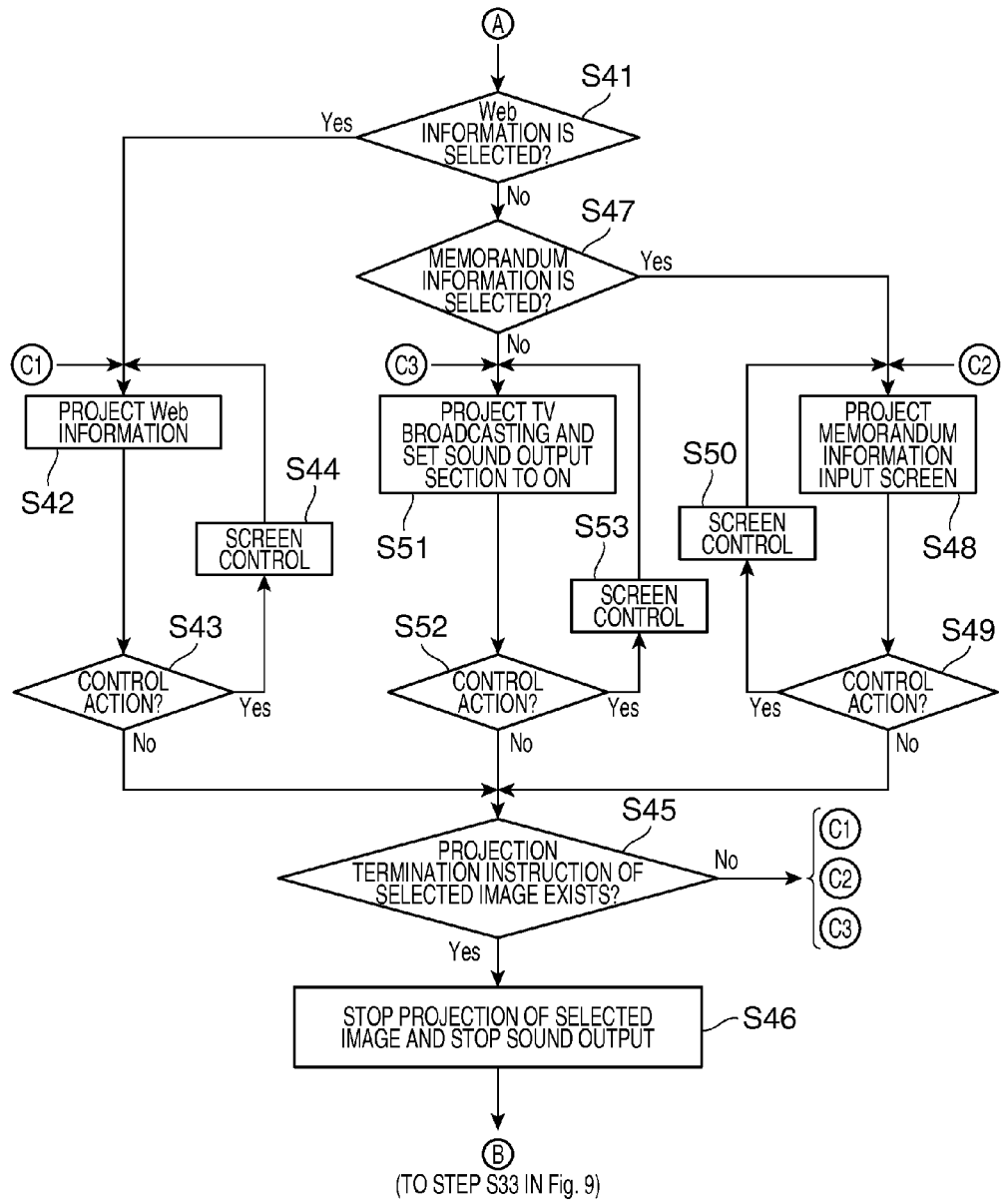
FIG. 10 is a flowchart for explaining the flow of the process in the case in which the user performs the menu selection in the step S32 in the flowchart shown in FIG. 9.

FIG. 10 is a flowchart for explaining the flow of the process in the case in which the user selects the type of the image from the menu selection screen. It should be noted that it is assumed that in the menu selection screen the three types of "Web information," "TV broadcasting," and "memorandum information" are prepared as the selectable image types, and it is arranged that the user can select either one of the three types described above.

It should be noted that in the case of selecting the type of the image from the menu selection screen projected, for example, the user performs the action of indicating the type of the image displayed on the menu selection screen with a finger or the like. The action performed by the user is imaged by the imaging section 130, and the imaged data thereof is provided to the control section 550. Thus, what image the user has selected can be determined in the control section 550.

In FIG. 10, firstly, in the case in which whether or not the user has selected the "Web information" is determined (step S41), and the user has selected the Web information (in the case of "Yes" in the step S41), the Web information selected by the user is projected (step S42). In this case, it is assumed that a page containing the material related to the learning, for example, is displayed.

After projecting such Web information, whether or not the user performs some sort of control action (e.g., a page-turning action of the material) is determined (step S43), and if the user performs some sort of control action (in the case of "Yes" in the step S43), the screen control corresponding to the control action performed by the user is performed (step S44). In this case, the screen control corresponds to, for example, the control of turning the page of the material in accordance with the page-turning action in response to the user performing the action. It should be noted that also in this case, the action (the page-turning action) performed by the user is imaged by the imaging section 130, and the control section 550 determines the action by the user based on the imaged data output from the imaging section 130 and then performs the screen control of turning the page of the material in accordance with the action of turning the page performed by the user.

On the other hand, if the control section 550 has determined that the user has not performed the control action described above (in the case of "No" in the step S43), the control section 550 determines (step S45) whether or not there exists a projection termination instruction of the image presently projected, namely the image (referred to as a selected image) selected from the menu selection screen.

Here, if the control section 550 determines that there exists the projection termination instruction of the selected image (in the case of "Yes" in the step S45), the control section 550 terminates the projection of the selected image, and at the same time terminates (step S46) the output of the sound when the output of the sound is performed. Then, the process subsequently proceeds to the path "B," and then the step S33 in FIG. 9 is performed. It should be noted that if the projection termination instruction of the selected image does not exist in the step S45 shown in FIG. 10 (in the case of "No"), the process proceeds to the path "C1" to return to the step S42, and then the control section 550 continues the projection of the Web information.

On the other hand, in the case in which the process proceeds to the path "B" in the step S46, and then proceeds to the step S33 in FIG. 9, whether or not the image projection start switch 520 is in the OFF state is determined in the step S33. Here, if the image projection start switch 520 is in the OFF state (in the case of "Yes" in the step S33), the process proceeds to the step S34. On the other hand, if the image projection start switch 520 is not in the OFF state (in the case of "No" in the step S33), the process proceeds to the step S31, and thus the menu selection becomes possible again.

Incidentally, if it is determined in the step S41 shown in FIG. 10 that the information selected by the user is not the "Web information" (in the case of "No" in the step S41), whether or not the information selected by the user is the "memorandum information" is determined (step S47). Then, if the user selects the memorandum information (in the case of "Yes" in the step S47), the control section 550 projects (step S48) a memorandum information input screen (e.g., a software keyboard).

Then, whether or not the user performs some sort of control action (e.g., an action of the user inputting a character and so on on the software keyboard) is determined (step S49), and if it is determined that the user has performed some sort of control action (in the case of "Yes" in the step S49), the screen control corresponding to the control action is performed (step S50). The screen control in this case is the control of making the imaging section 130 image the action of the user, and then projecting the memorandum information by the control section 550 based on the imaged data output from the imaging section 130.

On the other hand, if the control section 550 has determined that the user has not performed the control action described above (in the case of "No" in the step S49), the control section 550 determines (step S45) whether or not there exists the projection termination instruction of the selected image selected from the menu selection screen. If the projection termination instruction of the selected image does not exist in the step S45 (in the case of "No" in the step S45), the process proceeds to the path "C2" to return to the step S48, and then the control section 550 continues the projection of the memorandum information input screen. It should be noted that the case in which the projection termination instruction of the selected image exists (in the case of "Yes" in the step S45) in the step S45 is the same as described above, and therefore the explanation will be omitted.

Further, if it is determined in the step S47 in FIG. 10 that the information selected by the user is not the "memorandum information" (in the case of "No" in the step S47), the control section 550 projects the TV broadcasting, and at the same time sets (step S51) the sound output section 140 to the operating (ON) state. Then, whether or not the user performs some sort of control action (e.g., a channel switching action) is determined (step S52), and if it is determined that the user has performed some sort of control operation (in the case of "Yes" in the step S52), the screen control corresponding to the control action is performed (step S53). In this case, the image of the channel designated by the user is projected.

On the other hand, if the control section 550 has determined that the user has not performed the control action described above (in the case of "No" in the step S52), the control section 550 determines (step S45) whether or not there exists the projection termination instruction of the selected image selected from the menu selection screen. If the projection termination instruction of the selected image does not exist in the step S45 (in the case of "No" in the step S45), the process proceeds to the path "C3" to return to the step S51, and then the control section 550 continues the projection of the TV broadcasting. It should be noted that the case in which the projection termination instruction of the selected image exists (in the case of "Yes" in the step S45) in the step S45 is the same as described above, and therefore the explanation will be omitted.

As described above, in the lighting equipment 20 according to the second embodiment, since it is arranged that the type of the image to be projected can be selected, and the image of the type thus selected is projected, there can be obtained an advantage that the usage as the lighting equipment having an image projection function can further be diversified in addition to the advantage obtained by the lighting equipment 10 according to the first embodiment. It should be noted that although it is assumed in the lighting equipment 20 according to the second embodiment that the three types of images, namely the "Web information," the "TV broadcasting," and the "memorandum information," can be selected, these are nothing more than examples, and the selectable image types are not limited to these types. For example, taking the case of attaching the lighting equipment 20 according to the second embodiment to a student desk into consideration, it may be preferable in some case to remove the TV broadcasting from the selectable image types.

Third Embodiment

Figure 11A:
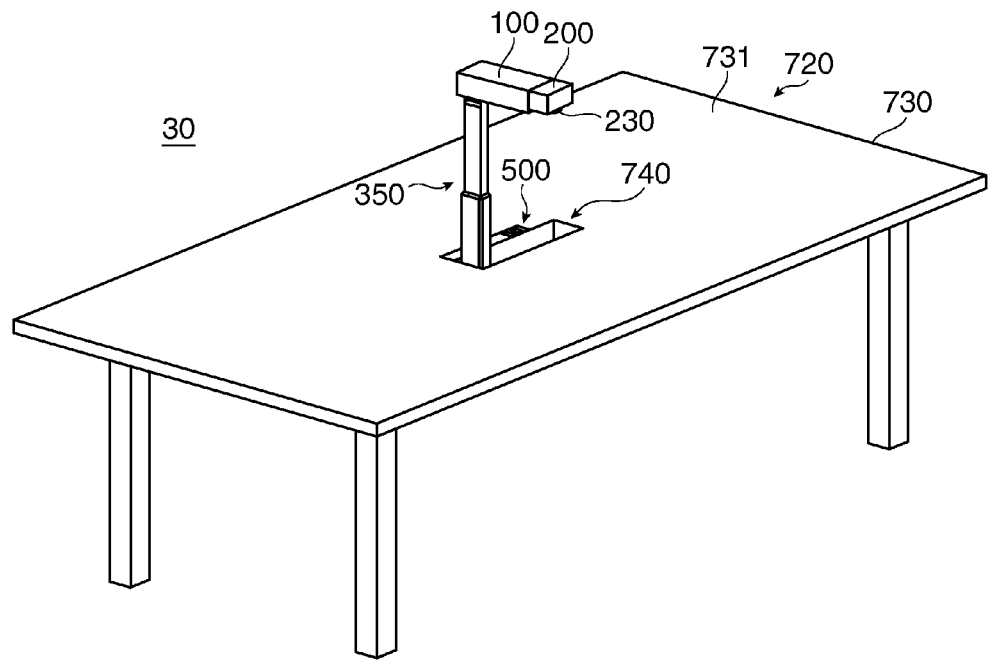
FIGS. 11A and 11B are diagrams showing a lighting equipment according to a third embodiment of the invention for the purpose of the explanation thereof.
Figure 11B:
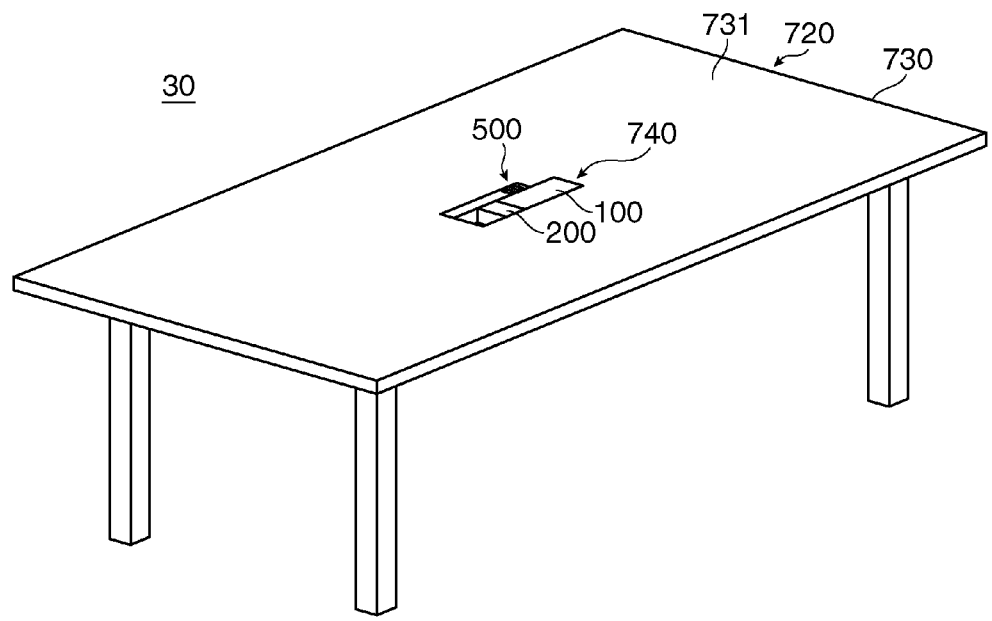
Figure 12:
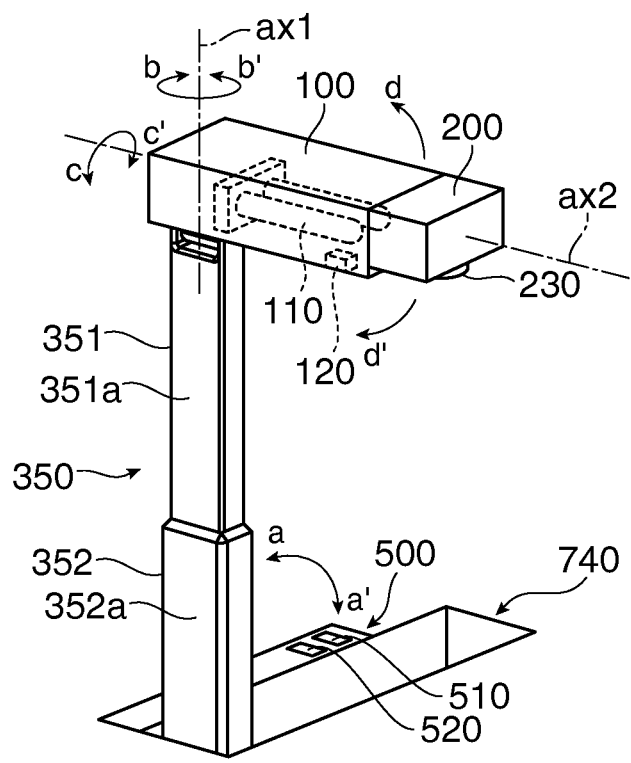
FIG. 12 is a diagram showing mainly an arm section of the lighting equipment according to the third embodiment in an enlarged manner.

FIGS. 11A and 11B are diagrams showing the lighting equipment 30 according to a third embodiment for the purpose of an explanation thereof. FIG. 11A is a diagram showing the case of getting into the state (referred to as a usable state) in which the illumination section 100 and the image projection section 200 are taken out from a housing section 740, and FIG. 11B is a diagram showing the case of getting into the state (referred to as a nonuse state) in which the illumination section 100 and the image projection section 200 are housed in the housing section 740. FIG. 12 is a diagram showing mainly the arm section 350 of the lighting equipment 30 according to the third embodiment in an enlarged manner.

As shown in FIGS. 11A, 11B, and 12, the lighting equipment 30 according to the third embodiment has a support member 720 for supporting the illumination section 100 in addition to the constituents such as the illumination section 100, the image projection section 200, and the operation section 500. The support member 720 has the surface to be the illumination object, and at the same time has the housing section 740 capable of housing the illumination section 100 and the image projection section 200. Further, the arm section 350 intervenes between the illumination section 100 and the housing section 740.

In the lighting equipment 30 according to the third embodiment, the support member 720 corresponds to a desk, and in this case, the desk corresponds to a "conference table." Therefore, the support member 720 is hereinafter also referred to as a "conference table 720." It should be noted that in this case, the surface to be the illumination object corresponds to the surface 731 (also referred to as a desktop surface 731) of a top board 730 of the conference table 720. Further, although the conference table 720 shown in FIGS. 11A and 11B has the top board 731 shaped like a rectangle, the shape is not limited to a rectangle, but can be a variety of shapes such as a square or a circle.

The conference table 720 supports the illumination section 100 with the arm section 350 intervening between the housing section 740 and the illumination section 100. The arm section 350 is a sort of the adjustable arm, and for making it possible to selectively get into either of the nonuse state in which the illumination section 100 and the image projection section 200 are housed in the housing section 740 and the usable state in which the illumination section 100 and the image projection section 200 are taken out from the housing section 740. It should be noted that structure and so on of the arm section 350 will be described later.

Further, in the lighting equipment 30 according to the third embodiment, similarly to the lighting equipment 10 according to the first embodiment and the lighting equipment 20 according to the second embodiment, the image projection section 200 is integrated with the illumination section 100. Therefore, the housing section 740 is arranged to be able to house the illumination section 100 and the image projection section 200 in the state in which the image projection section 200 is integrated with the illumination section 100. It should be noted that it is assumed that the housing section 740 is disposed in the central portion of the desktop surface 731 of the conference table 720.

As shown in FIG. 12, the arm section 350 has a first arm 351 having the tip portion to which the illumination section 100 is attached, and a second arm 352 for supporting the first arm 351. The second arm 352 is supported in the base section (not shown) by a support mechanism (not shown) disposed in the housing section 740 so as to be rotatable within a predetermined angle range (assumed to be roughly 90 degrees) in the arrow a-a' direction shown in FIG. 12.

Further, the second arm 352 telescopically supports the first arm 351 to thereby make it possible to house the first arm 351 inside the second arm 352 and to draw it out from the second arm 352.

Further, the first arm 351 supports the illumination section 100 so that the illumination section 100 is rotatable around the center axis ax1 of the first arm 351 (in the arrow b-b' direction) within a predetermined angle range. Further, the first arm 351 supports the illumination section 100 so that the illumination section 100 is rotatable around the center axis ax2 penetrating the first arm 351 side end portion of the illumination section 100 and the image projection section 200 side end portion thereof (in the arrow c-c' direction) within a predetermined angle range.

Since the first arm 351 supports the illumination section 100 so that the illumination section 100 can be rotated around the center axis ax1 (in the arrow b-b' direction) within a predetermined angle range as described above, in the case in which the illumination section 100 and the image projection section 200 are set to the usable state (the state shown in FIG. 11A), the illumination section 100 and the image projection section 200 can be moved on a plane along the desktop surface 731 so as to draw a circular arc. Thus, it is possible to arbitrarily change the position in the desktop surface 731 where the illumination or the projection is performed.

It should be noted that since the image projection section 200 is integrated with the illumination section 100, if, for example, the illumination section 100 is moved, the image projection section 200 is also moved together with the illumination section 100, and if the image projection section 200 is moved, the illumination section 100 is also moved together with the image projection section 200.

Further, since the first arm 351 supports the illumination section 100 so that the illumination section 100 can be rotated around the center axis ax2 (in the arrow c-c' direction) within a predetermined angle range, in the case in which the illumination section 100 and the image projection section 200 are set to the usable state (the state shown in FIG. 11A), the illumination angle and the projection angle of the illumination section 100 and the image projection section 200 with respect to the desktop surface 731 can arbitrarily be changed within a predetermined range.

Further, the first arm 351 supports the illumination section 100 so as to be rotatable in a vertical direction. Specifically, the first arm 351 supports the illumination section 100 so as to make the illumination section 100 rotatable in a direction (an upward direction, the arrow d direction) in which the illumination section 100 gets away from the desktop surface 731 and a direction (a downward direction, the arrow d' direction) in which the illumination section 100 comes toward the desktop surface 731 within a predetermined angle range.

Since the first arm 351 supports the illumination section 100 in such a manner as described above, the illumination angle and the projection angle of the illumination section 100 and the image projection section 200 with respect to the desktop surface 731 can arbitrarily be changed in a predetermined range. Further, it is possible to fold the illumination section 100 and the image projection section 200 when putting the illumination section 100 and the image projection section 200 into the housing section 740.

Specifically, when putting the illumination section 100 and the image projection section 200 into the housing section 740, the illumination section 100 is set to the state of being rotated roughly 90 degrees in a direction (the arrow d' direction) toward the desktop surface 731. Thus, there occurs the state in which the illumination light source 110 provided to the illumination section 100 is closely opposed in parallel to a side surface section 351*a* of the first arm 351.

If the first arm 351 is put into the second arm 352 in this state, the illumination light source 110 provided to the illumination section 100 gets into the state of being closely opposed in parallel to a side surface section 352*a* of the second arm 352. It should be noted that the operation of setting the illumination section 100 to the state of being rotated roughly 90 degrees in the direction toward the desktop surface 731 can also be performed after putting the first arm 351 into the second arm 352.

It should be noted that the state in which the illumination section 100 in the horizontal state is rotated roughly 90 degrees in the direction (the arrow d' direction) toward the desktop surface 731, namely the state in which the illumination section 100 is closely opposed to the arm section 350, will hereinafter be described as a "state of folding the illumination section 100" or a "state in which the illumination section 100 is folded."

As explained hereinabove, the arm section 350 is arranged to be capable of both of the telescopic action and the folding action, and by using such an arm section 350, it is possible to selectively set the illumination section 100 and the image projection section 200 to either one of the nonuse state and the usable state. It should be noted that a specific example of an operation for making it possible to selectively set the illumination section 100 or the image projection section 200 to either one of the nonuse state and the usable state will be described later.

Incidentally, it is assumed that as the configuration of the illumination section 100, the configuration of the image projection section 200, and the configuration of the operation section 500, and so on in the lighting equipment 30 according to the third embodiment, substantially the same configurations (see, e.g., FIGS. 1 and 2) as those in the lighting equipment 10 according to the first embodiment is adopted, and the same constituents as those of the lighting equipment 10 according to the first embodiment will be denoted with the same reference numerals. Further, the configuration and the control action thereof for performing a variety of electrical control in the lighting equipment 30 according to the third embodiment can also be realized in such a manner as in the case of the lighting equipment 10 according to the first embodiment (see, e.g., FIGS. 3 and 5).

FIGS. 13A through 13C, 14A, and 14B are diagrams for explaining an operation example for making it possible to selectively set the illumination section 100 and the image projection section 200 to either one of the nonuse state and the usable state. It should be noted that since in the lighting equipment 30 according to the third embodiment, the image projection section 200 is integrated with the illumination section 100, the explanation of the operation for setting the illumination section 100 and the image projection section 200 to either one of the nonuse state and the usable state in FIGS. 13A through 13C, 14A, and 14B is assumed to be presented using the operation of either one of the illumination section 100 and the image projection section 200.

Figure 13A:
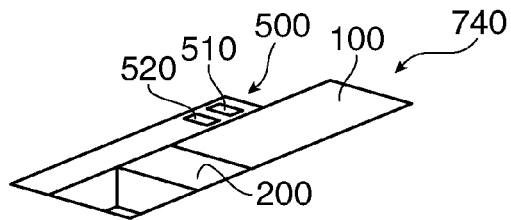
FIGS. 13A through 13C are diagrams for explaining an operation example for making it possible to selectively set an illumination section or an image projection section to either one of a nonuse state and a usable state.
Figure 13B:
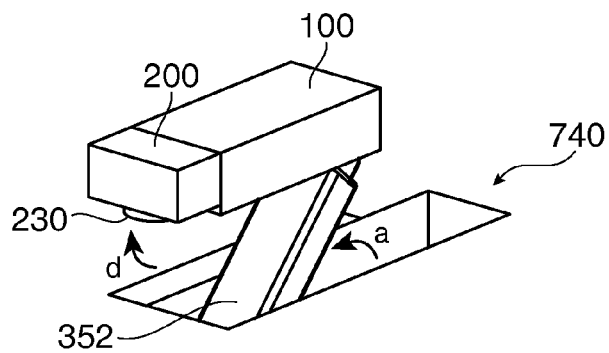
Figure 13C:
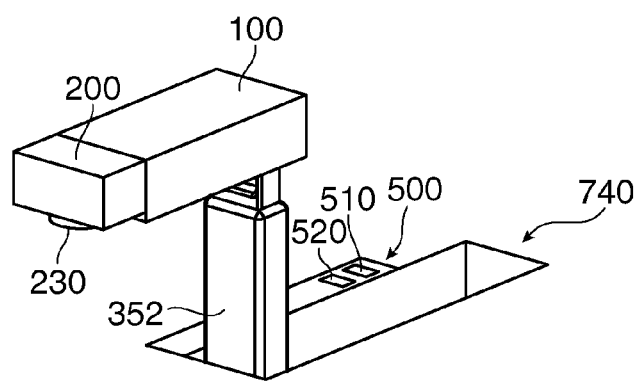

FIG. 13A is a diagram showing the case in which the illumination section 100 and the image projection section 200 are set to the nonuse state, and in such a nonuse state, the first arm 351 is housed in the second arm 352, and the second arm 352 is housed in the housing section 740 in the folded state, and further the illumination section 100 and the image projection section 200 are also housed in the housing section 740 in the folded state. In such a nonuse state, it is preferable to arrange that the second arm 352, the illumination section 100, and the image projection section 200 are prevented from getting into the state of projecting from the desktop surface 731 (see FIG. 11B).

If the second arm 352 is rotated in the arrow "a" direction (see FIG. 13B) while rotating the image projection section 200 in the arrow d direction in the state shown in FIG. 13A, the second arm 352 gets into the erect state (see FIG. 13C) in due course. In this state, the first arm 351 is pulled out (see FIG. 14A) from the second arm 352 in the upward direction (the arrow e direction). Then, the image projection section 200 is rotated, for example, 90 degrees counterclockwise (in the arrow b' direction) around the center axis ax1 on a horizontal plane so that the illumination section 100 and the image projection section 200 are opposed to the position where the illumination is to be performed or the position where the image is to be projected in the desktop surface 731.

Figure 14A:
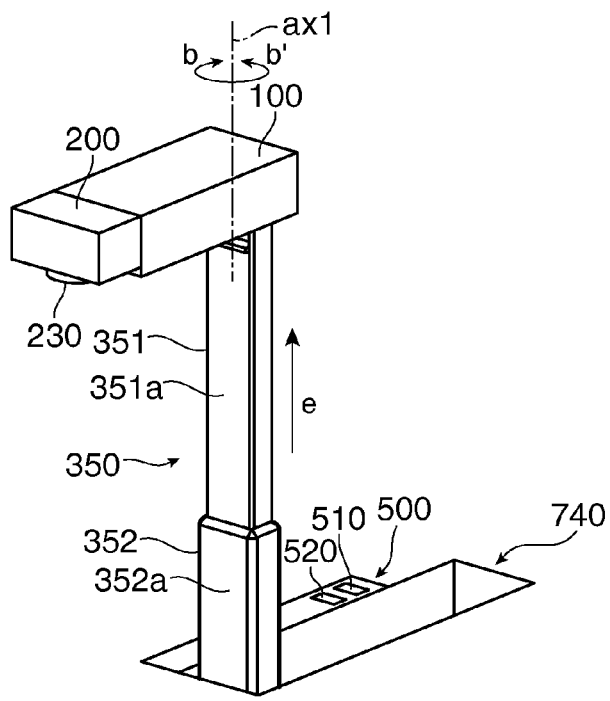
FIGS. 14A and 14B are diagrams for explaining an operation example for making it possible to selectively set the illumination section or the image projection section to either one of the nonuse state and the usable state.
Figure 14B:
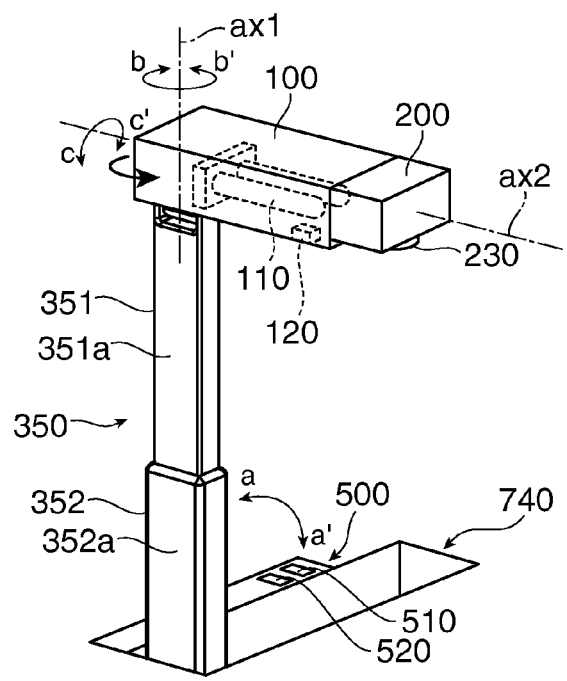

By performing such an operation, the illumination section 100 and the image projection section 200 get into the state shown in FIG. 14B. The state shown in FIG. 14B is the state (the usable state) substantially the same as shown in FIGS. 11A and 12, and in the usable state, the illumination and the projection at a predetermined position on the surface (the desktop surface 731) to be the illumination object become available. It should be noted that in the usable state shown in FIGS. 11A and 12, the projection range in which the image projection section 200 performs the projection of the image can arbitrarily be set in accordance with, for example, the size of the surface (the desktop surface 731) to be the illumination object, but is preferably equivalent to, for example, the A4 size through the A3 size.

On the other hand, in the case of changing the state from the usable state shown in FIG. 14B to the nonuse state shown in FIG. 13A, it is sufficient to perform the opposite operation. Specifically, the first arm 351 is put into the second arm 352, and at the same time the illumination section 100 and the image projection section 200 are set to the folded state, and then the second arm 352 is laid to the housing section 740 side (in the arrow a' direction) to thereby be put into the housing section 740. Thus, it is possible to set the nonuse state shown in FIG. 13A.

It should be noted that it is also possible to provide a lid (not shown in the lighting equipment 30 according to the third embodiment), which can open and close the housing section 740, to the housing section 740. For example, when the illumination section 100 and the image projection section 200 are in the nonuse state shown in FIG. 13A, the lid is applied so as to cover the housing section 740. Further, when setting the illumination section 100 or the image projection section 200 to the usable state, the lid is opened, and then the operation shown in FIGS. 13B, 13C, 14A, and 14B is performed.

By providing such a lid, it is possible to roughly flat the entire desktop surface 731 and thus the desktop surface 731 can be used as a larger area when the illumination section 100 and the image projection section 200 are in the nonuse state. Further, since the illumination section 100 and the image projection section 200 are not exposed, it becomes difficult for the dust to adhere to the illumination section 100 and the image projection section 200. Further, if a liquid such as a drink is spilt on the desktop surface 731, it becomes difficult for the illumination section 100 and the image projection section 200 to be directly splashed with the liquid, and therefore, it is possible to protect the illumination section 100 and the image projection section 200.

It should be noted that the lid can also be a lid having a detachable structure, or can also be a lid having a structure slidable along the desktop surface 731, or can also be a lid having a structure having one side supported by the top board 730 with a hinge, and rotating within a predetermined angle range taking the hinge as an axis.

As explained hereinabove, the lighting equipment 30 according to the third embodiment is provided with the support member 720 (the conference table 720 in the lighting equipment 30 according to the third embodiment) having the surface to be the illumination object and the housing section 740 capable of housing the illumination section 100 and the image projection section 200, in addition to the constituents such as the illumination section 100, the image projection section 200, and the operation section 500, and therefore becomes suitable for the case of holding a meeting of a relatively small group while projecting an image.

Specifically, in the lighting equipment 30 according to the third embodiment, if, for example, it is necessary to project an image when holding a meeting, only by performing the operation of taking out the illumination section 100 and the image projection section 200 from the housing section 740 of the conference table 720 as the support member, it is possible to set the image projection section 200 to the usable state. Thus, it is possible to arbitrarily project a variety of images necessary for the meeting on the conference table 720 with an appropriate size (e.g., the size equivalent to the A4 size through the A3 size) with ease.

Incidentally, in the related art, even in the meeting of a relatively small group, it is necessary to bother to install a personal computer or the like as information equipment for displaying images on the conference table or to project the images on a screen with a general projector when holding the meeting while viewing some sort of images. However, in the lighting equipment 30 according to the third embodiment, such a trouble can be saved.

Further, in the lighting equipment 30 according to the third embodiment, it is possible to project the images in the vicinity of the central portion of the conference table 720. Further, the illumination section 100 and the image projection section 200 are arranged to be able to rotate within a predetermined angle range on a plane along the desktop surface 731. Therefore, by appropriately rotate the illumination section 100 and the image projection section 200 on the plane along the desktop surface 731, it is possible for the participants of the meeting sitting at any positions to easily view the images thus projected. Thus, it becomes easy for all of the participants of the meeting to share the information to thereby proceed the meeting smoothly.

Further, although the conference table is exemplified as the support member 720 in the lighting equipment 30 according to the third embodiment, it is also possible to adopt a student desk, an office desk, a table for business negotiation in an outlet store or the like, a table for a front desk window installed in a front desk window of a financial institution, a hotel, and further a leisure facility, and so on besides the conference table.

For example, in the case in which the support member 720 is the table for business negotiation in an outlet store or the like, it is possible to project images necessary for the explanation on the desktop surface of the table for business negotiation when the sales person provides the detailed explanation on the product, which the customer is interested in buying, to the customer. Thus, it is possible for the sales person to provide the explanation while viewing the image projected, and for the customer to listen to the explanation while viewing the image projected. Therefore, it becomes easy for the sales person to provide the explanation, and it becomes easy for the customer to understand the content thus explained.

It should be noted that it is obvious that the control of the brightness of the light source, the control for obtaining the image to be projected, and so on can also be performed in the lighting equipment 30 according to the third embodiment similarly to the lighting equipment 10 according to the first embodiment. Further, it is also possible to perform the illumination alone without performing the projection of an image in the lighting equipment 30 according to the third embodiment similarly to the lighting equipment 10 according to the first embodiment, and further it is possible to use the image projection section 200 as the auxiliary illumination section of the illumination section 100.

It should be noted that although in the lighting equipment 30 according to the third embodiment, there is exemplified the case in which the configuration of the illumination section 100, the configuration of the image projection section 200, and the electrical control of the lighting equipment 30 according to the third embodiment are made substantially the same as those of the lighting equipment 10 according to the first embodiment, it is also possible to make the configuration of the illumination section 100, the configuration of the image projection section 200, and the electrical control of the lighting equipment 30 according to the third embodiment substantially the same as those of the lighting equipment 20 according to the second embodiment (see, e.g., FIGS. 7, 8, 9, and 10).

Fourth Embodiment

Figure 15A:
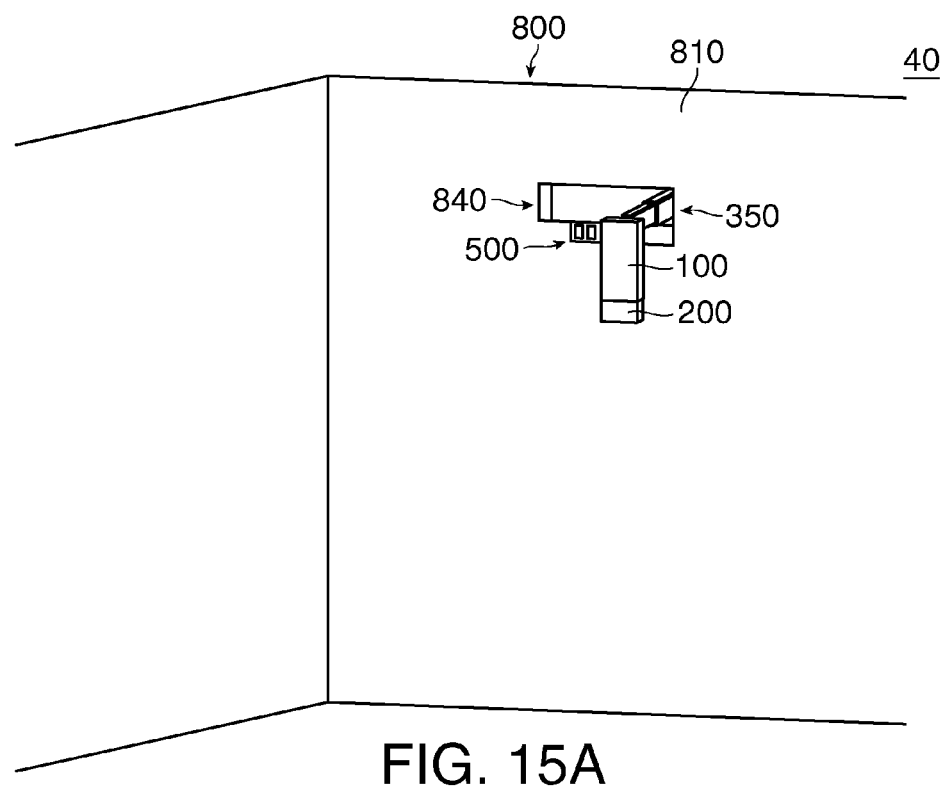
FIGS. 15A and 15B are diagrams showing the lighting equipment according to a fourth embodiment of the invention for the purpose of the explanation thereof.
Figure 15B:
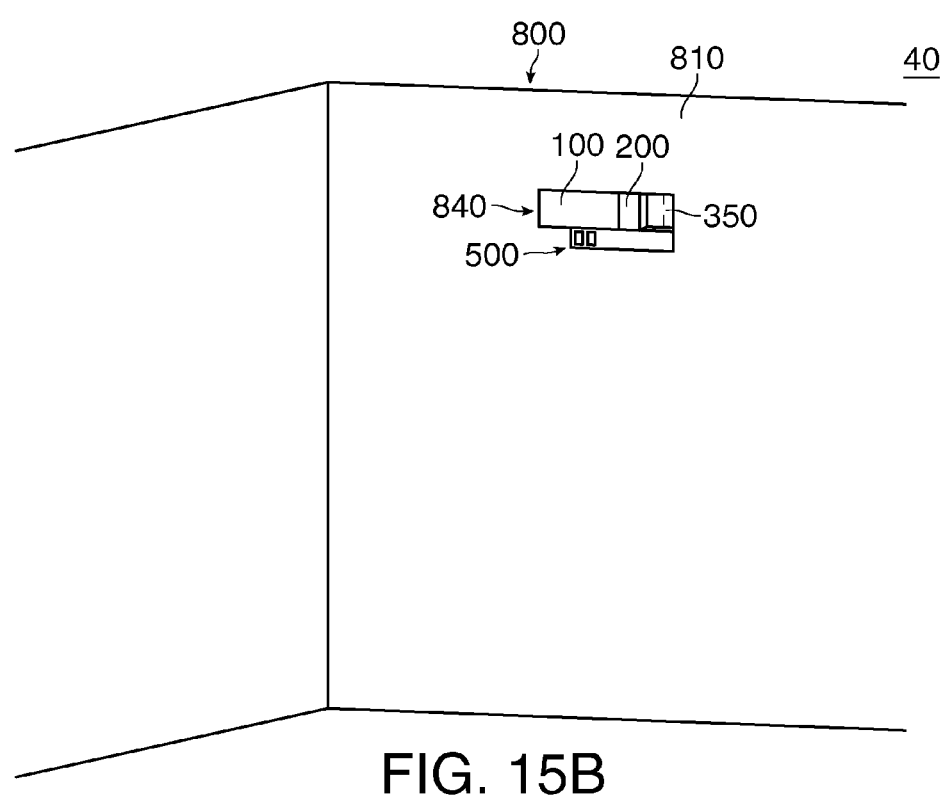

FIGS. 15A and 15B are diagrams showing a lighting equipment 40 according to a fourth embodiment of the invention for the purpose of an explanation thereof. FIG. 15A is a diagram showing the case of getting into the state (the usable state) in which the illumination section 100 and the image projection section 200 are taken out from a housing section 840, and FIG. 15B is a diagram showing the case of getting into the state (the nonuse state) in which the illumination section 100 and the image projection section 200 are housed in the housing section 840.

The point in which the lighting equipment 40 according to the fourth embodiment is different from the lighting equipment 30 according to the third embodiment is that a wall (referred to as a "wall 800" in the lighting equipment 40 according to the fourth embodiment) is used as the support member for supporting the illumination section 100 in the lighting equipment 40 according to the fourth embodiment although the desk (the conference table 720) is used as the support member for supporting the illumination section 100 in the lighting equipment 30 according to the third embodiment, and the lighting equipment 40 according to the fourth embodiment is the same as the lighting equipment 30 according to the third embodiment in the other points. Therefore, the same constituents are denoted with the same reference numerals. Further, in this case, the surface to be the illumination object corresponds to the surface 810 (referred to as a wall surface 810) of the wall 800.

In the lighting equipment 40 according to the fourth embodiment, the housing section 840 is provided to the wall surface 810. As shown in FIGS. 15A and 15B, the housing section 840 is disposed so that the longitudinal direction of the housing section 840 coincides with a horizontal direction (a direction along a horizontal line) in the wall surface 810. Further, the arm section 350 is attached to the housing section 840, and the illumination section 100 is attached to the arm section 350.

It should be noted that the configuration of the arm section 350, the way of attaching the illumination section 100 to the arm section 350, and so on are substantially the same as those in the lighting equipment 30 according to the third embodiment, and further, the configuration of the housing section 840 is also substantially the same as that of the housing section 740 in the lighting equipment 30 according to the third embodiment.

In also the lighting equipment 40 according to the fourth embodiment, the operation for setting the illumination section 100 and the image projection section 200 to either of the usable state and the nonuse state can be performed using the operation shown in FIGS. 13A through 13C, 14A, and 14B. Further, it is also possible to provide a lid (not shown in the lighting equipment 40 according to the fourth embodiment), which can open and close the housing section 840, to the housing section 840. By providing such a lid, it is possible to roughly flat the entire wall surface 810 when the illumination section 100 and the image projection section 200 are in the nonuse state. Further, since the illumination section 100 and the image projection section 200 are not exposed, it becomes difficult for the dust to be attached thereto, and at the same time the illumination section 100 and the image projection section 200 can be protected.

As explained hereinabove, according to the lighting equipment 40 related to the fourth embodiment, in the case in which, for example, the conference table is installed in the vicinity of the wall surface 810, and a meeting is held using the conference table, it is possible to set the illumination section 100 and the image projection section 200 to the usable state only by performing the operation of taking out the illumination section 100, which is housed in the housing section 840 disposed on the wall surface 810, from the housing section 840. Thus, it is possible to arbitrarily project a variety of images necessary for the meeting on the wall surface 810 with an appropriate size (e.g., the size equivalent to the A4 size through the A3 size) with ease in the case of, for example, holding the meeting of a relatively small group.

Further, the lighting equipment 40 according to the fourth embodiment can also be used for a variety of usages besides a meeting. For example, the lighting equipment 40 is preferably used in the case of, for example, displaying some information for a predetermined period of time in a public facility or an office in order to inform the general public of the information.

It should be noted that it is obvious that the control of the brightness of the light source, the control for obtaining the image to be projected, and so on can also be performed in the lighting equipment 40 according to the fourth embodiment similarly to the lighting equipment 10 according to the first embodiment. Further, it is also possible to perform the illumination alone without performing the projection of an image in the lighting equipment 40 according to the fourth embodiment similarly to the lighting equipment 10 according to the first embodiment, and it is possible to use the image projection section 200 as the auxiliary illumination section.

Modified Example of Lighting Equipment 40 According to Fourth Embodiment

Figure 16A:
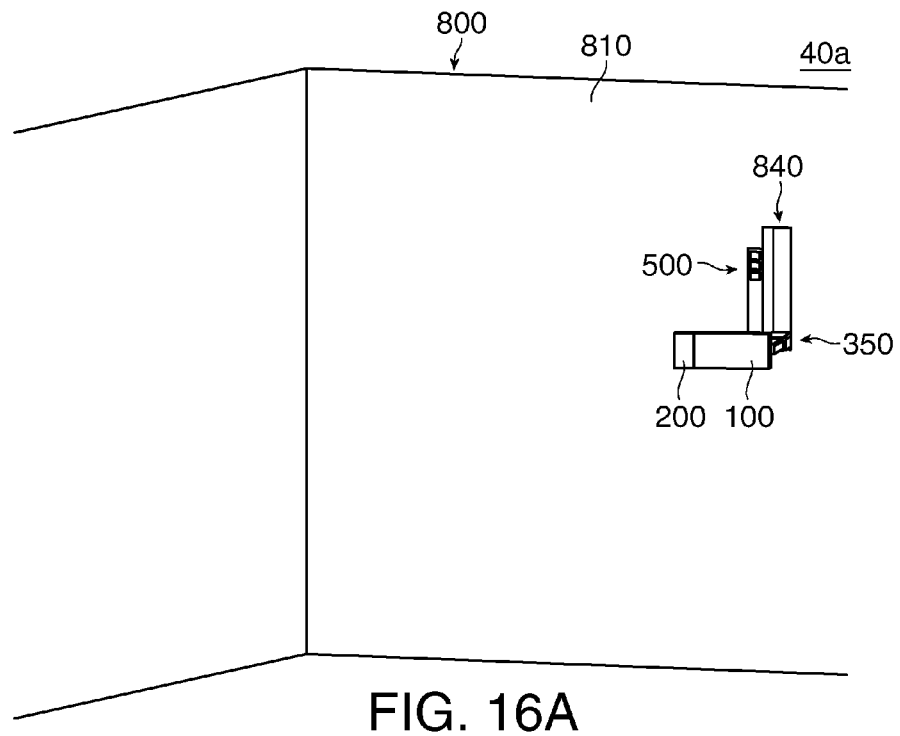
FIGS. 16A and 16B are diagrams showing a modified example of the lighting equipment according to the fourth embodiment for the purpose of the explanation thereof.
Figure 16B:
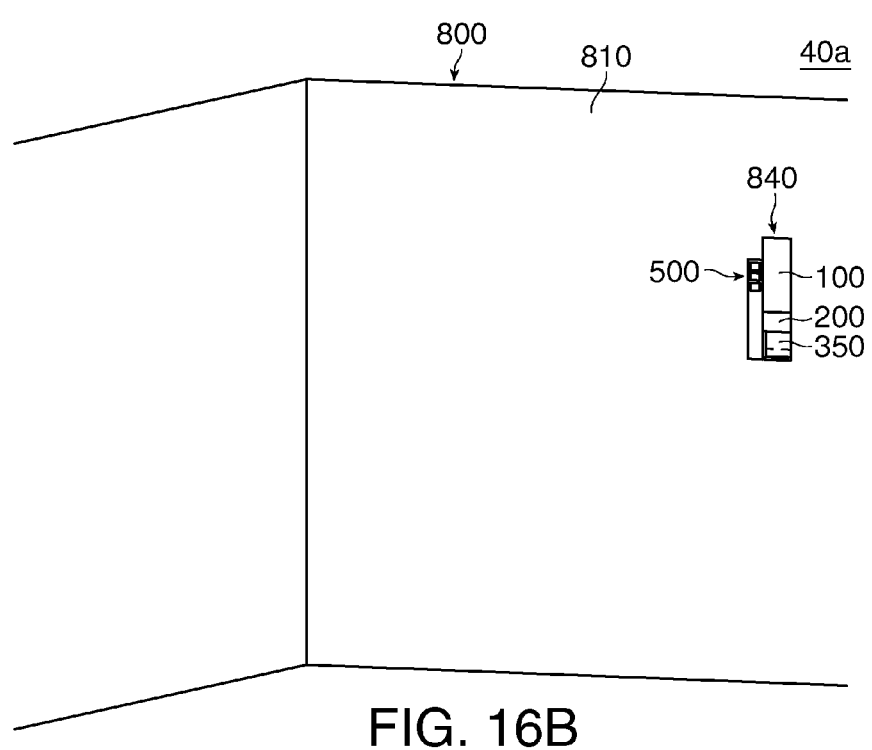

FIGS. 16A and 16B are diagrams showing a modified example of the lighting equipment 40 according to the fourth embodiment for the purpose of an explanation thereof. The modified example (referred to as a lighting equipment 40a) of the lighting equipment 40 according to the fourth embodiment is arranged to have the housing section 840 the longitudinal direction of which coincides with a vertical direction (a direction along a vertical line) in the wall surface 810 as shown in FIGS. 16A and 16B, and is substantially the same as the lighting equipment 40 according to the fourth embodiment shown in FIGS. 15A and 15B in the other points. The lighting equipment 40a shown in FIGS. 16A and 16B can be used in substantially the same manner as the lighting equipment 40 according to the fourth embodiment.

Fifth Embodiment

FIGS. 17A through 17C are diagrams showing a desk 50 with an illumination function according to a fifth embodiment of the invention for the purpose of the explanation thereof. As shown in FIGS. 17A through 17C, the desk 50 with an illumination function according to the fifth embodiment is, for example, a conference table, and is provided with a top board 910 having a surface to be the illumination object, a top board support section 920 for supporting the top board 910, the illumination section 100 capable of illuminating the surface to be the illumination object, the image projection section 200 capable of projecting an image on the surface to be the illumination object, the operation section 500 capable of a variety of operations, a housing section 940 provided to the top board 910 and capable of housing the illumination section 100 and the image projection section 200, and the arm section 350 intervening between the illumination section 100 and the housing section 940 and for making it possible to selectively achieve either one of the nonuse state in which the illumination section 100 and the image projection section 200 are housed in the housing section 940 and the usable state in which the illumination section 100 and the image projection section 200 are taken out from the housing section 940.

It should be noted that although in the desk 50 with an illumination function according to the fifth embodiment the top board support section 920 is formed of four legs, the top board support section 920 is not limited to the legs, but can also be a sort of pedestal section.

In the desk 50 with an illumination function according to the fifth embodiment, the same constituents as those of the lighting equipment 30 according to the third embodiment are denoted with the same reference numerals. Therefore, the illumination section 100, the image projection section 200, and the arm section 350 have the same configurations as those of the illumination section 100, the image projection section 200, and the arm section 350 in the lighting equipment 30 according to the third embodiment. Further, the housing section 940 provided to the desk 50 with an illumination function according to the fifth embodiment has the same configuration as that of the housing section 740 in the lighting equipment 30 according to the third embodiment.

Further, in the desk 50 with an illumination function according to the fifth embodiment, the housing section 940 is provided with a lid 950 capable of opening and closing the housing section 940. It should be noted that in the desk 50 with an illumination function according to the fifth embodiment, the lid 950 is assumed to be a detachable lid.

Further, although not shown in FIGS. 17A through 17C, similarly to the lighting equipment 10 according to the first embodiment, the control section 550 (see FIG. 3) for electrically controlling the illumination section 100 and the image projection section 200, the connecting cord connectable to the electrical outlet, and so on are also provided.

Incidentally, FIG. 17A is a diagram showing the state (the nonuse state) in which the illumination section 100 and the image projection section 200 are housed in the housing section 940, and in which the housing section 940 is covered by the lid 950, FIG. 17B is a diagram showing the state in which the lid 950 is removed in the state shown in FIG. 17A, and FIG. 17C is a diagram showing the state (the usable state) in which the illumination section 100 and the image projection section 200 are taken out from the housing section 940.

In the desk 50 with an illumination function according to the fifth embodiment having such a configuration, if the illumination section 100 and the image projection section 200 are in the nonuse state, the housing section 940 disposed on the surface 911 (also referred to as a desktop surface 911) of the top board 910 can be covered by the lid 950 as shown in FIG. 17A.

By covering the housing section 940 with the lid 940 as described above, it is possible to roughly flat the entire desktop surface 911 to thereby use the desktop surface 911 as a larger area. Further, since the illumination section 100 and the image projection section 200 are not exposed, it becomes difficult for the dust to adhere to the illumination section 100 and the image projection section 200. Further, if a liquid such as a drink is spilt on the desktop surface 911, it becomes difficult for the illumination section 100 and the image projection section 200 to be directly splashed with the liquid, and therefore, it is possible to protect the illumination section 100 and the image projection section 200.

It should be noted that although the detachable lid is exemplified as the lid 950 in the desk 50 with an illumination function according to the fifth embodiment, the detachable lid is not necessarily required. For example, it is possible to adopt a lid having a structure slidable along the desktop surface 911, or a lid having a structure having one side supported by the top board 910 with a hinge, and rotating within a predetermined angle range taking the hinge as an axis.

On the other hand, in the case of using the illumination section 100 and the image projection section 200, the lid 950 is detached as shown in FIG. 17B. It should be noted that it is sufficient for the lid 950 thus detached to be placed at a place where the lid 950 does not hinder the projection in the desktop surface 911 when the image projection section 200 performs the projection. Subsequently, the operation of taking out the illumination section 100 and the image projection section 200 is performed in the state shown in FIG. 17B. It should be noted that as the operation of taking out the illumination section 100 and the image projection section 200 in the state shown in FIG. 17B, it is sufficient to perform substantially the same operation as the operation shown in FIGS. 13A through 13C, 14A, and 14B.

By performing the operation of taking out the illumination section 100 and the image projection section 200 in the state shown in FIG. 17B, the illumination section 100 and the image projection section 200 are set to the usable state as shown in FIG. 17C. On the other hand, in the case of changing the state from the usable state shown in FIG. 17C to the nonuse state shown in FIG. 17A, it is sufficient to perform the opposite operation.

The desk 50 with an illumination function according to the fifth embodiment configured as described above can be used in a similar manner to the lighting equipment 30 according to the third embodiment. Therefore, in also the desk 50 with an illumination function according to the fifth embodiment, substantially the same advantage as that of the lighting equipment 30 according to the third embodiment can be obtained.

Although the invention is hereinabove explained based on the embodiments described above, the invention is not limited to the embodiments described above, but can be put into practice in variously modified forms within the scope or the spirit of the invention, and the following modifications, for example, are also possible.

1. The appearance configurations and the shapes of the lighting equipments 10 through 40 according to the first through fourth embodiments, and the appearance configuration and the shape of the desk 50 with an illumination function according to the fifth embodiment are not limited to the appearance configurations and the shapes shown in the respective embodiments. Further, although in the lighting equipment 10 according to the first embodiment and the lighting equipment 20 according to the second embodiment, the case in which the illumination section 100 is attached to the adjustable arm 300 is exemplified, the illumination section 100 is not necessarily required to be attached to the adjustable arm 300, but is only required to be attached so as to be able to illuminate the surface to be the illumination object such as the desktop surface.

2. Although in the lighting equipments 10 through 40 according to the first through fourth embodiments and the desk 50 with an illumination function according to the fifth embodiment, the structure in which the image projection section 200 is integrated with the illumination section 100 is adopted, it is also possible to adopt the structure in which the image projection section 200 is provided as a separate member from the illumination section 100 and the image projection section 200 is detachable from the illumination section 100. In the case of adopting the structure of making the image projection section 200 detachable from the illumination section 100, the coupling surfaces of the illumination section 100 and the image projection section 200 are respectively provided with connecting sections (not shown). Further, in the case of attaching the image projection section 200 to the illumination section 100, the connecting section on the image projection section 200 side is connected to the connecting section on the illumination section 100 side to thereby arrange that the image projection section 200 and the illumination section 100 are structurally and electrically connected to each other. It should be noted that in this case, it is also possible to provide the communication function, which makes the communication with the outside possible, to the image projection section 200 side.

Further, in the case of providing the image projection section 200 as a separate member with respect to the illumination section 100, the image projection section 200 can be of a lamp type. In this case, it is also possible to dispose, for example, a light bulb attaching socket, to which a general incandescent light bulb can be attached, on the illumination section 100 side, and a connecting member (a cap) equivalent to the general incandescent light bulb on the image projection section 200 side as the respective connecting sections of the illumination section 100 and the image projection section 200 to thereby arrange that the image projection section 200 can be attached to the illumination section 100 in the similar way to the case of attaching the incandescent light bulb.

Figure 18:
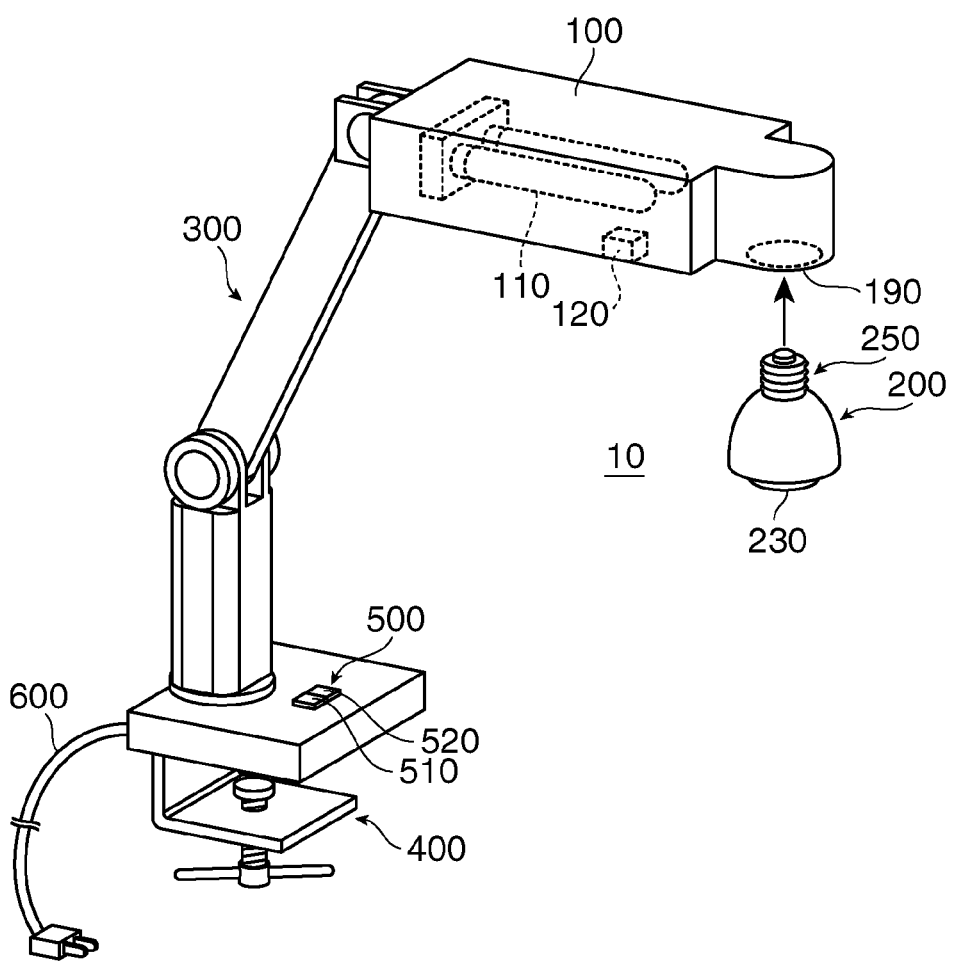
FIG. 18 is a diagram showing the case of forming the image projection section to be of a lamp type for the purpose of the explanation thereof.

FIG. 18 is a diagram showing the case of forming the image projection section 200 to be of a lamp type for the purpose of the explanation thereof. It should be noted that although the explanation is presented in FIG. 18 assuming that the illumination section 100 has substantially the same configuration as that of the illumination section 100 in the lighting equipment 10 according to the first embodiment, this configuration can also be put into practice in the case in which the illumination section 100 has substantially the same configuration as that of the illumination section 100 in either of the lighting equipments 20 through 40 according to the second through fourth embodiments, and the desk 50 with an illumination function according to the fifth embodiment.

As shown in FIG. 18, the illumination section 100 is provided with the light bulb attaching socket 190, and the image projection section 200 is provided with the cap 250 as the connecting member which can be connected to the light bulb attaching socket 190. By adopting such a configuration, when attaching the image projection section 200 to the illumination section 100, the image projection section 200 can be attached to the illumination section 100 in a similar manner to the case of attaching a general incandescent light bulb. It should be noted that the configuration of the optical system and so on of the image projection section 200 can be made substantially the same as that of the lighting equipment 10 according to the first embodiment. Further, the configuration of the electrical control system can also be made substantially the same as those of the lighting equipment 10 according to the first embodiment and the lighting equipment 20 according to the second embodiment. It should be noted that in this case it is also possible to arrange that the communication function and so on are disposed on the image projection section 200 side.

Further, as shown in FIG. 18, in the case of adopting the image projection section 200 of the lamp type, or the case in which the image projection section 200 is made as a separate member from the illumination section 100 besides the lamp type to thereby be detachable from the illumination section 100, it is preferable for the housing section 740 in the lighting equipment 30 according to the third embodiment, the housing section 840 in the lighting equipment 40 according to the fourth embodiment, and the housing section 940 in the desk 50 with an illumination function according to the fifth embodiment to have a structure capable of housing the image projection section 200 formed as a separate member in addition to the illumination section 100.

In the case in which each of the housing sections 740, 840, and 940 has the structure capable of housing the image projection section 200 in each of the housing sections 740, 840, and 940 while being attached to the illumination section 100, it is preferable that the image projection section 200 is housed in each of the housing sections 740, 840, and 940 while keeping the state in which the image projection section 200 is attached to the illumination section 100, and at the same time the image projection section 200 is housed in each of the housing sections 740, 840, and 940 also in the state (the state of the separate member) in which the image projection section 200 is not attached to the illumination section 100. Thus, it is possible to assure the preservation place for the image projection section 200 as the separate member, and when performing the projection of the image, it becomes unnecessary to bring the image projection section 200 from another preservation place, and therefore, the device becomes superior in usability.

3. As a method of a focus adjustment, it is also possible to use a lens, which has electrodes, and is expanded and contracted (varied in thickness) in accordance with the level of the voltage applied to the electrodes, and is thus capable of adjusting the focal distance (referred to as a focus adjustment), as the projection lens 230 of the image projection section 200, or it is also possible to adopt an automatic focus adjustment function using a servo motor, which is adopted in, for example, a digital camera. It should be noted that the lens provided with the electrodes is known to the public, and there exists one having a lens thickness varied from 750 micrometers to 375 micrometers when applying a voltage of 20 volts to the electrodes, for example. By using such a lens as the projection lens 230, it is possible to automatically perform the focus adjustment by applying the voltage to the electrodes, the voltage corresponding to the distance to the projection surface (e.g., the desktop surface 710 shown in FIG. 4) measured by the distance measurement section 120.

4. In the illumination section 20 according to the second embodiment described above, regarding the various types of instructions (e.g., the menu selection instruction from the menu selection screen) to the image projection section 200, it is arranged that the action performed by the user is imaged by the imaging section 130, and then the control section 550 performs the control corresponding to the operation of the user based on the imaged image data. On the other hand, although the instructions of starting and stopping the image projection is arranged to be performed by the ON/OFF operation of the image projection start switch 520, it is also possible to arrange that regarding also the instructions of starting the image projection and stopping the image projection, the user performs some sort of action, the imaging section 130 images the action performed by the user, and then the control section 550 performs the control (starting the image projection or stopping the image projection) corresponding to the action of the user based on the imaged image data.

This can also be applied to the lighting equipment 10 according to the first embodiment, the lighting equipments 30, 40 according to the third and fourth embodiments, and the desk 50 with an illumination function according to the fifth embodiment, and in these cases, this can be realized in the lighting equipment 10 according to the first embodiment, the lighting equipments 30, 40 according to the third and fourth embodiments, and the desk 50 with an illumination function according to the fifth embodiment similarly to the lighting equipment 20 according to the second embodiment by providing the imaging section 130.

5. Although in the lighting equipment 10 according to the first embodiment and the lighting equipment 20 according to the second embodiment, the case of using the lighting equipment 10 according to the first embodiment and the lighting equipment 20 according to the second embodiment to the student desk is exemplified, the lighting equipment 10 according to the first embodiment and the lighting equipment 20 according to the second embodiment can be used in various fields such as an office desk or a conference table besides the student desk.

6. The arm section 350 used in the lighting equipment 30 according to the third embodiment, the lighting equipment 40 according to the fourth embodiment, and the desk 50 with an illumination function according to the fifth embodiment is assumed to have the structure (see, e.g., FIG. 12) capable of the telescopic and folding actions. However, the arm section 350 is not limited to those having such a structure, but arm sections with various structures can be adopted. For example, citing the lighting equipment 30 according to the third embodiment as an example, if the arm section 350 has a structure capable of a multiple folding action, it is possible to house the illumination section 100 and the image projection section 200 in the housing section 740 without having the telescopic structure. Further, depending on the structure of the desk, it may be possible to house the illumination section 100 and the image projection section 200 in the housing section 740 only with the telescopic structure even without having the folding structure in some cases. Further, it is also possible to arrange that the action of housing the illumination section 100 and the image projection section 200 into the housing section 740 and the action of taking them out from the housing section 740 are performed in an electric-powered manner.

7. Although in each of the embodiments described above, the case of using the liquid crystal light modulation element as the light modulation element is exemplified, the light modulation element is not limited thereto, but can be the light modulation element using a digital micromirror device.

What is claimed is:

1. A lighting equipment comprising:
    an illumination section capable of illuminating a surface to be an illumination object;
    an image projection section capable of projecting an image on the surface to be the illumination object; and
    a control section adapted to electrically control the illumination section and the image projection section,
    wherein the illumination section and the image projection section are capable of being controlled independently by the control section such that the illumination section can illuminate the surface without the image projection section projecting an image and that the image projection section is capable of projecting an image without the illumination section illuminating the surface,
    wherein each of the image projection section and the illumination section has an independent light source which is independently controlled by the control section.

2. The lighting equipment according to claim 1, wherein the control section makes a light source of the image projection section light to thereby make the image projection section function as an auxiliary illumination section.

3. The lighting equipment according to claim 2, wherein the control section has a function of calculating illuminance of the surface to be the illumination object in a state in which the illumination section performs illumination, and a function of determining whether or not the illuminance calculated is within an appropriate illuminance range set as a range of an appropriate illuminance, and then performing an illuminance adjustment so that the illuminance falls within the appropriate illuminance range based on a result of the determination, and adjusts brightness of the illumination section so that the illuminance falls within the appropriate illuminance range.

4. The lighting equipment according to claim 3, wherein the control section adjusts the brightness of the illumination section so that the illuminance falls within the appropriate illuminance range in one of a case in which the illuminance, which is obtained when the image projection section is made to function as the auxiliary illumination section, exceeds an upper limit value of the appropriate illuminance range, and a case in which the illuminance is lower than a lower limit value of the appropriate illuminance range.

5. The lighting equipment according to claim 1, wherein the image projection section is disposed integrally with the illumination section.

6. The lighting equipment according to claim 1, wherein the image projection section is attached detachably to the illumination section.

7. The lighting equipment according to claim 1, wherein the control section has a function of obtaining image information corresponding to the image to be projected from a network.

8. The lighting equipment according to claim 1, wherein the control section has a function of projecting a selection screen with which a type of the image to be projected can be selected.

9. The lighting equipment according to claim 1, further comprising:
    an arm section adapted to support the illumination section.

10. The lighting equipment according to claim 9, wherein the arm section is an adjustable arm.

11. The lighting equipment according to claim 9, further comprising:
    a support member including a housing section having the surface to be the illumination object, and capable of housing the illumination section and the image projection section, and adapted to support the illumination section,
    wherein the arm section intervenes between the illumination section and the housing section, and makes it possible to selectively set either one of a nonuse state in which the illumination section and the image projection section are housed in the housing section, and a usable state in which the illumination section and the image projection section are taken out from the housing section.

12. The lighting equipment according to claim 11, wherein the arm section has a structure capable of at least one of a telescopic action and a folding action, and makes it possible to selectively set either one of the nonuse state and the usable state using the structure capable of at least one of the telescopic action and the folding action.

13. The lighting equipment according to claim 11, wherein the illumination section and the image projection section are arranged to be rotatable around the arm section on a plane along the surface to be the illumination object.

14. The lighting equipment according to claim 11, wherein the support member is a desk, the surface to be the illumination object is a desktop surface of the desk, and the housing section is provided to the desktop surface.

15. The lighting equipment according to claim 11, wherein the support member is a wall, the surface to be the illumination object is a surface of the wall, and the housing section is provided to the surface of the wall.

16. The lighting equipment according to claim 11, wherein the housing section has a lid capable of opening and closing the housing section, and the lid covers the housing section in the nonuse state in which the illumination section and the image projection section are housed in the housing section.

17. The lighting equipment according to claim 1, wherein the image projection section is disposed adjacent to the illumination section.

18. A desk with an illumination function, comprising:
    a top board having a surface to be an illumination object;
    a top board support section adapted to support the top board;
    an illumination section capable of illuminating the surface to be the illumination object;
    an image projection section capable of projecting an image on the surface to be the illumination object;
    a control section adapted to electrically control the illumination section and the image projection section;
    a housing section provided to the top board, and capable of housing the illumination section and the image projection section; and
    an arm section intervening between the illumination section and the housing section, and making it possible to selectively set either one of a nonuse state in which the illumination section and the image projection section are housed in the housing section, and a usable state in which the illumination section and the image projection section are taken out from the housing section, the illumination section and the image projection section are capable of being controlled independently by the control section such that the illumination section can illuminate the surface without the image projection section projecting an image and that the image projection section is capable of projecting an image without the illumination section illuminating the surface, wherein each of the image projection section and the illumination section has an independent light source which is independently controlled by control section.

19. The desk with an illumination function according to claim 18, wherein the image projection section is disposed adjacent to the illumination section.

\* \* \* \* \*